(12) United States Patent
Shibasaki

(10) Patent No.: US 11,882,087 B2
(45) Date of Patent: Jan. 23, 2024

(54) CONVERSION OF COMMUNICATION DESTINATION INFORMATION REGARDING MAIL-RELATED INFORMATION OF MAIL THAT HAS BEEN RECEIVED

(71) Applicant: NEC Corporation, Tokyo (JP)

(72) Inventor: Ryo Shibasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/641,563

(22) PCT Filed: Aug. 27, 2020

(86) PCT No.: PCT/JP2020/032419
§ 371 (c)(1),
(2) Date: Mar. 9, 2022

(87) PCT Pub. No.: WO2021/059852
PCT Pub. Date: Apr. 1, 2021

(65) Prior Publication Data
US 2022/0337542 A1 Oct. 20, 2022

(30) Foreign Application Priority Data
Sep. 24, 2019 (JP) .................................. 2019-172806

(51) Int. Cl.
*G06F 15/16* (2006.01)
*H04L 51/48* (2022.01)
(Continued)

(52) U.S. Cl.
CPC .............. *H04L 51/48* (2022.05); *H04L 51/08* (2013.01); *H04L 63/083* (2013.01)

(58) Field of Classification Search
CPC ........ H04L 51/48; H04L 51/08; H04L 63/083
(Continued)

(56) References Cited

U.S. PATENT DOCUMENTS 5,418,908 A * 5/1995 Keller .................. G06Q 10/107
715/205
5,613,108 A * 3/1997 Morikawa ............ G06Q 10/107
(Continued)

FOREIGN PATENT DOCUMENTS

JP 2008-146363 A 6/2008
JP 2009-100399 A 5/2009
(Continued)

OTHER PUBLICATIONS

International Search Report for PCT Application No. PCT/JP2020/032419, dated Oct. 6, 2020.
(Continued)

*Primary Examiner* — Alicia Baturay

(57) ABSTRACT

The present invention enables a user to easily reference information of a communication destination related to email-related information included in an email transmitted to a terminal connected to a network for which communication with another network is restricted. Prescribed email-related information is extracted from a received email, a conversion is carried out, from communication destination information of a communication destination related to the email-related information, into read information wherein the communication destination information can be read by a method not utilizing a network by a first terminal that is not connected to a network to which a second terminal receiving the email is connected, and an email to which the read information has been appended is output to the second terminal.

20 Claims, 15 Drawing Sheets

(51) Int. Cl.
*H04L 51/08* (2022.01)
*H04L 9/40* (2022.01)

(58) Field of Classification Search
USPC ......................................................... 709/206
See application file for complete search history.

(56) References Cited

U.S. PATENT DOCUMENTS

| | | | | |
|---|---|---|---|---|
| 5,771,355 | A * | 6/1998 | Kuzma | H04L 9/40 715/205 |
| 5,781,901 | A * | 7/1998 | Kuzma | H04L 51/56 358/440 |
| 5,903,723 | A * | 5/1999 | Beck | G06Q 10/107 709/200 |
| 6,009,462 | A * | 12/1999 | Birrell | H04L 51/212 709/206 |
| 6,332,164 | B1 * | 12/2001 | Jain | H04L 51/212 709/235 |
| 6,505,236 | B1 * | 1/2003 | Pollack | H04L 51/42 709/200 |
| 6,687,741 | B1 * | 2/2004 | Ramaley | H04L 51/08 709/206 |
| 6,728,757 | B1 * | 4/2004 | Friend | H04L 51/066 709/206 |
| 7,133,897 | B1 * | 11/2006 | Tran | H04L 51/00 709/224 |
| 7,451,187 | B2 * | 11/2008 | Malik | H04L 51/214 709/206 |
| 7,509,386 | B2 * | 3/2009 | Miyashita | G06F 16/9558 709/206 |
| 9,203,650 | B2 * | 12/2015 | Malcolm | H04L 63/20 |
| 9,559,997 | B1 * | 1/2017 | Everton | H04L 51/212 |
| 9,847,973 | B1 * | 12/2017 | Jakobsson | H04L 63/0245 |
| 9,894,020 | B2 * | 2/2018 | Shkolnikov | H04L 51/063 |
| 10,096,001 | B1 * | 10/2018 | Everton | G06Q 10/107 |
| 10,326,735 | B2 * | 6/2019 | Jakobsson | H04L 63/1433 |
| 10,432,563 | B2 * | 10/2019 | Morikubo | H04L 51/224 |
| 10,715,543 | B2 * | 7/2020 | Jakobsson | H04L 63/1433 |
| 10,805,270 | B2 * | 10/2020 | Jakobsson | H04L 63/1441 |
| 10,805,314 | B2 * | 10/2020 | Jakobsson | H04L 51/23 |
| 10,880,322 | B1 * | 12/2020 | Jakobsson | H04L 51/08 |
| 10,992,645 | B2 * | 4/2021 | Jakobsson | H04L 63/0245 |
| 11,019,076 | B1 * | 5/2021 | Jakobsson | H04L 51/42 |
| 11,044,267 | B2 * | 6/2021 | Jakobsson | H04L 63/1433 |
| 11,102,244 | B1 * | 8/2021 | Jakobsson | H04L 51/42 |
| 2004/0073634 | A1 * | 4/2004 | Haghpassand | H04L 9/0861 709/228 |
| 2010/0011077 | A1 | 1/2010 | Shkolnikov et al. | |

FOREIGN PATENT DOCUMENTS

| | | |
|---|---|---|
| JP | 2009-146306 A | 7/2009 |
| JP | 2010-282626 A | 12/2010 |
| JP | 2016-189148 A | 11/2016 |

OTHER PUBLICATIONS

English translation of Written opinion for PCT Application No. PCT/JP2020/032419, dated Oct. 6, 2020.
JP Office Action for JP Application No. 2021-548450, dated Feb. 21, 2023 with English Translation.

* cited by examiner

CONVERSION OF COMMUNICATION DESTINATION INFORMATION REGARDING MAIL-RELATED INFORMATION OF MAIL THAT HAS BEEN RECEIVED

This application is a National Stage Entry of PCT/JP2020/032419 filed on Aug. 27, 2020, which claims priority from Japanese Patent Application 2019-172806 filed on Sep. 24, 2019, the contents of all of which are incorporated herein by reference, in their entirety.

TECHNICAL FIELD

The present invention relates to an information conversion device, an information conversion system, an information conversion method, and a recording medium.

BACKGROUND ART

Use of the Internet is highly convenient, but presents a risk of becoming a route of infection of a computer virus or information leakage due to infection of a virus.

Accordingly, in a task of handling confidential information such as personal information, a network (hereinafter, referred to as a "second network") in which measures for prohibiting communication with another network (hereinafter, referred to as a "first network") are taken may be used.

Under such an environment, a terminal connected to the second network may not be capable of communicating with a communication destination indicated by a uniform resource locator (URL), a telephone number, or the like (hereinafter referred to as "communication destination information") included in a mail.

The reason will be described.

A situation is assumed in which a mail server used in a task of handling confidential information such as personal information transmits and receives mails to and from the first network, but communication other than transmission and reception of mails is not permitted between the mail server and the first network.

A situation is also assumed in which, in order to protect the confidential information, only a terminal connected to the second network can refer to the mails of this mail server. A situation is also assumed in which a terminal that is not connected to the second network cannot refer to the mail server via the first network.

In this situation, a second terminal connected to the second network can read the mails of the mail server. On the other hand, since communication with the first network is prohibited in the second network, the second terminal cannot communicate with a communication destination included in the first network.

Therefore, when referring to information of a communication destination indicated by the communication destination information (URL or the like) included in a mail sent to the second terminal connected to the second network, a user needs to input the communication destination information to a first terminal connectable to the first network. As the user inputs, the first terminal communicates with the communication destination indicated by the communication destination information.

As described above, since the second terminal connected to the second network cannot communicate with the communication destination included in the first network, the user needs to input the communication destination information to the first terminal connected to the first network.

As in the above-described method, when communication is performed with the communication destination indicated by the communication destination information in the first terminal different from the second terminal to which the mail is sent, it is not easy to perform communication with the communication destination.

On the other hand, in a method described in PTL 1, the server device generates the URL for communication on the basis of a Media Access Control address (MAC address) and an Internet Protocol address (IP address) allocated to the server device. Moreover, the server device outputs a two-dimensional barcode associated to a communication URL, and displays the communication URL and the two-dimensional barcode on a screen of a predetermined terminal.

Then, a remote terminal reads the two-dimensional barcode displayed on the predetermined terminal. Thus, the remote terminal can communicate with the server device by communicating with the communication URL associated to the read two-dimensional barcode.

In a method described in PTL 2, a service host computer converts the URL of the authentication host computer into a QR code (registered trademark). Then, the service host computer transmits screen data for displaying an image of the QR code (registered trademark) on a display of a user personal computer (PC) to the user PC.

Further, the user captures an image of the QR code (registered trademark) displayed on a display of the user PC with a mobile terminal. As the user operates, the mobile terminal decodes the QR code (registered trademark) into a URL. This enables the mobile terminal to communicate with an authentication host computer.

As described above, in the methods described in PTL 1 and PTL 2, the server device converts the URL for communicating with a specific device into the two-dimensional barcode and displays the two-dimensional barcode on the screen, and the user captures an image of the two-dimensional barcode using a terminal of the user. This enables the terminal of the user to communicate with the communication destination indicated by the URL without the user inputting the URL.

CITATION LIST

Patent Literature

[PTL 1] JP 2009-146306 A
[PTL 2] JP 2008-146363 A

SUMMARY OF INVENTION

Technical Problem

However, in the methods described in PTL 1 and PTL 2, a system including a predetermined server device creates communication destination information for communicating with the predetermined server device, and converts the created communication destination information into two-dimensional information. Thus, in these methods, the server device cannot convert communication destination information regarding various communication destinations into the two-dimensional barcode.

For example, it is assumed that a mail including the communication destination information is sent to a terminal whose communication with the first network is restricted as described above.

In this case, the methods described in PTL 1 and PTL 2 can convert only the communication destination information indicating the predetermined server device included in the system into the two-dimensional barcode. Thus, the communication destination information indicating various communication destinations included in the mail cannot be converted into the two-dimensional barcode.

Thus, in the methods described in PTL 1 and PTL 2, there is a problem that the user cannot easily refer to information of the communication destination indicated by the communication destination information included in a mail sent to a terminal whose communication with other networks is restricted.

An object of the present invention is to provide an information conversion device, a system, a method, and a recording medium that enable a user to easily refer to information held by a communication destination regarding mail-related information included in a mail sent to a terminal connected to a network in which communication with other networks is restricted.

Solution to Problem

In one aspect of the present invention, an information conversion device includes an extraction means configured to extract predetermined mail-related information from a received mail, and an output means configured to perform conversion of communication destination information of a communication destination related to the mail-related information into read information that allows the communication destination information to be read by a first terminal, which is not connected to a network to which a second terminal that receives the mail is connected, by a method not via the network, and output the mail to which the read information is added to the second terminal.

In another aspect of the present invention, an information conversion method includes extracting predetermined mail-related information from a received mail, and performing conversion of communication destination information of a communication destination related to the mail-related information into read information that allows the communication destination information to be read by a first terminal, which is not connected to a network to which a second terminal that receives the mail is connected, by a method not via the network, and outputting the mail to which the read information is added to the second terminal.

In another aspect of the present invention, an information conversion program recorded in a computer-readable recording medium causes a computer to achieve an extraction function that extracts predetermined mail-related information from a received mail, and an output function that performs conversion of communication destination information of a communication destination related to the mail-related information into read information that allows the communication destination information to be read by a first terminal, which is not connected to a network to which a second terminal that receives the mail is connected, by a method not via the network, and outputs the mail to which the read information is added to the second terminal.

Advantageous Effects of Invention

According to the information conversion device, system, method, and recording medium of the present invention, a user can easily refer to information held by a communication destination regarding mail-related information included in a mail sent to a terminal connected to a network in which communication with other networks is restricted.

EXAMPLE EMBODIMENT

First Example Embodiment

A first example embodiment of the present invention will be described.

Figure 1:
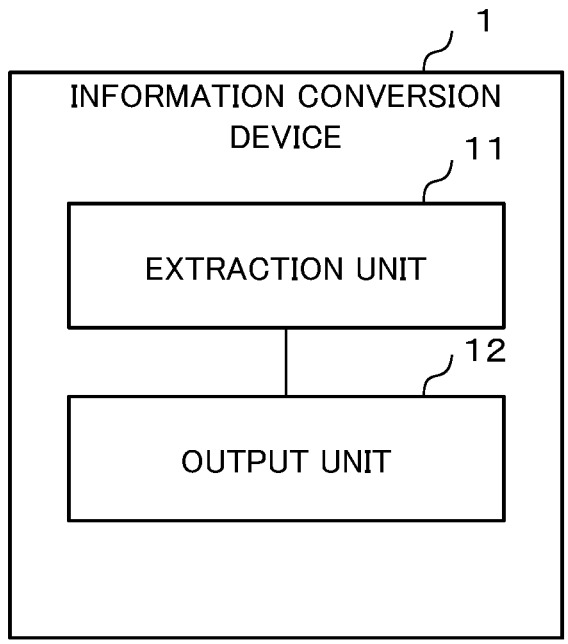
FIG. 1 is a diagram illustrating a configuration example of an information conversion device of a first example embodiment of the present invention.

FIG. 1 is a block diagram illustrating a configuration example of an information conversion device 1 of the present example embodiment. The information conversion device 1 of the present example embodiment includes an extraction unit 11 and an output unit 12.

The extraction unit 11 extracts predetermined mail-related information from a received mail.

The output unit 12 converts communication destination information of a communication destination related to the mail-related information into read information that allows the communication destination information to be read by a first terminal, which is not connected to a network to which a second terminal that receives the mail is connected, by a method not via the network. Then, the output unit 12 outputs the mail to which the read information is added to the second terminal.

By configuring the information conversion device 1 in this manner, the information conversion device 1 extracts the mail-related information from the received mail. The information conversion device 1 further converts the communication destination information into the read information, and outputs the mail to which the read information readable by the first terminal is added to the second terminal.

Thus, the first terminal that is not connected to the network to which the second terminal is connected can read the read information included in the mail sent to the second terminal connected to the network. Further, the first terminal can perform communication to the communication destination indicated by the communication destination information based on the read information.

Thus, the user can easily refer to information held by the communication destination regarding the mail-related information included in a mail sent to a terminal connected to a network in which communication with other networks is restricted.

Figure 2:
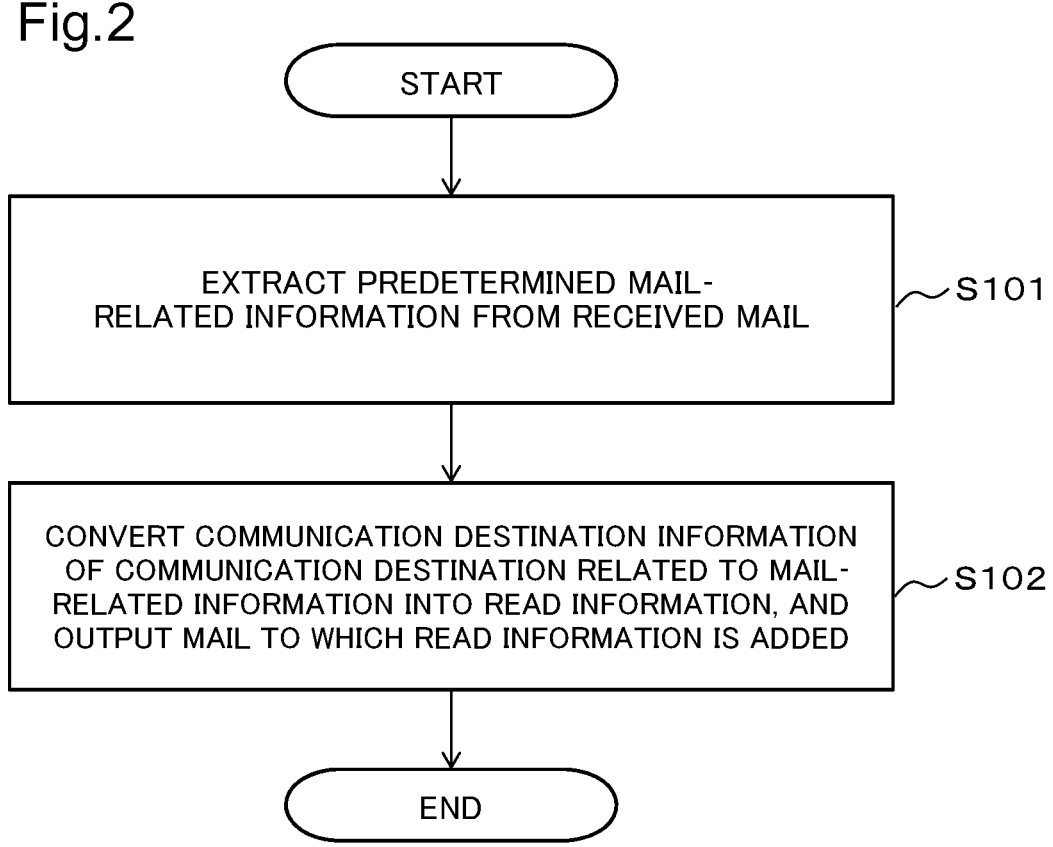
FIG. 2 is a flowchart illustrating an operation example of the information conversion device of the first example embodiment of the present invention.

Next, FIG. 2 illustrates an example of operation of the information conversion device 1 of the present example embodiment.

The extraction unit 11 extracts the predetermined mail-related information from the received mail (step S101).

The output unit 12 converts the communication destination information of the communication destination related to the mail-related information into the read information readable by the first terminal, which is not connected to the network to which the second terminal that receives the mail is connected, by the method not via the network. Further, the output unit 12 outputs the mail to which the read information is added. (Step S102).

By operating in this manner, the information conversion device 1 extracts the predetermined mail-related information from the received mail. Further, the information conversion device 1 converts the communication destination information of the communication destination related to the mail-related information into read information readable by the first terminal, and outputs the mail to which the read information is added to the second terminal.

Thus, the first terminal that is not connected to the network to which the second terminal is connected can read the read information included in the mail sent to the second terminal connected to the network. Further, the first terminal can perform communication to the communication destination indicated by the communication destination information based on the read information.

Thus, the user can easily refer to information held by the communication destination regarding the mail-related information included in a mail sent to a terminal connected to a network in which communication with other networks is restricted.

Second Example Embodiment

Next, an information conversion device 1 according to a second example embodiment of the present invention will be specifically described. In the present example embodiment, a case where mail-related information extracted from a mail by the information conversion device 1 is communication destination information indicating a communication destination will be described.

Figure 3:
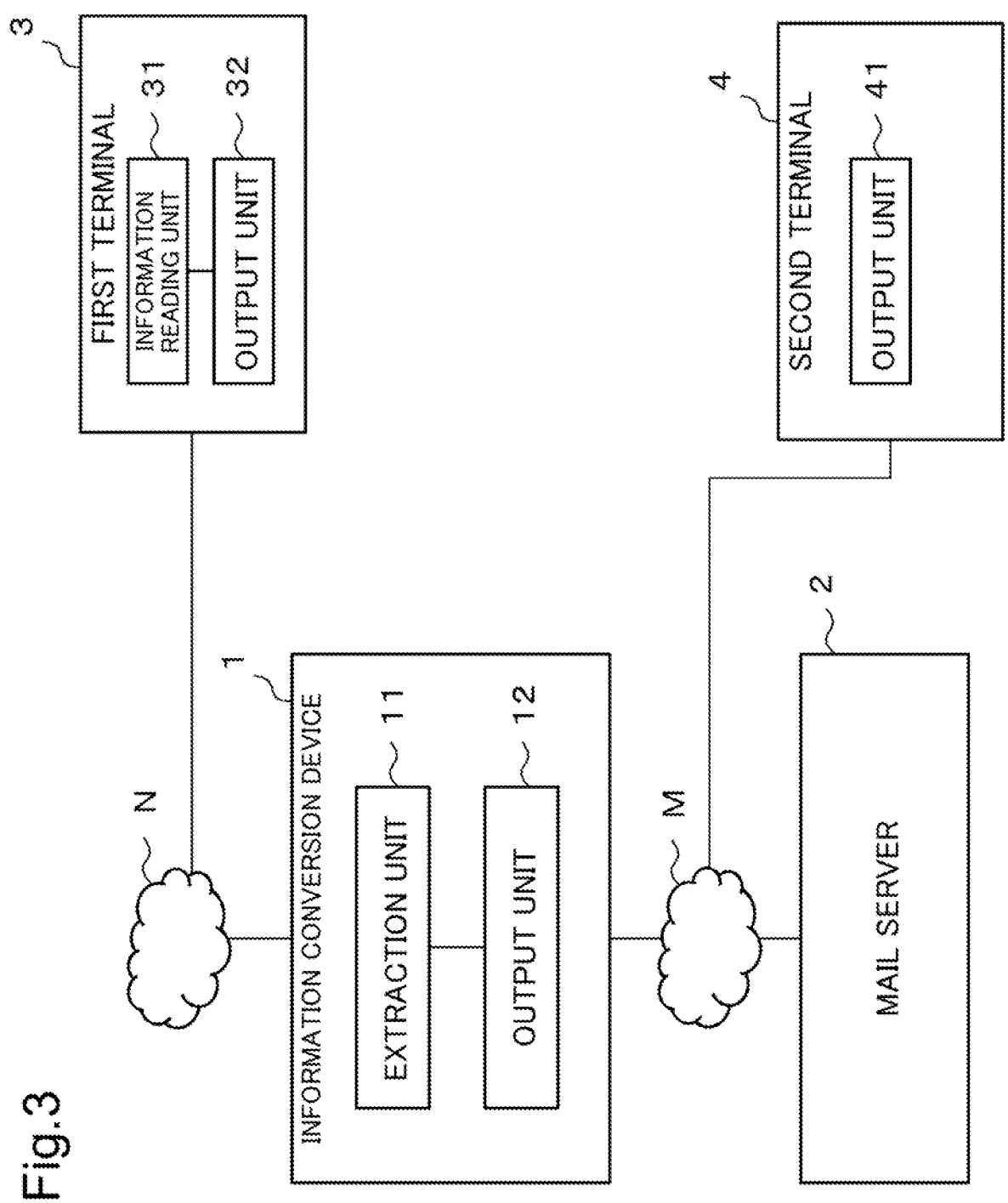
FIG. 3 is a diagram illustrating a configuration example of an information conversion system of a second example embodiment of the present invention.

FIG. 3 illustrates a configuration example of an information conversion system of the present example embodiment. The information conversion system of the present example embodiment includes a first network N, a second network M, the information conversion device 1, a mail server 2, a first terminal 3, and a second terminal 4. The number of each of the first terminal 3 and the second terminal 4 is any of one or two or more.

In the present example embodiment, the first network N is assumed as a network that cannot communicate with the second network M.

The second network M is assumed as a network that cannot communicate with the first network N.

The mail server 2 is a server in which a mail is referred by the second terminal 4. The mail server 2 stores a mail received via the second network M or the first network N and addressed to a terminal connected to the second network M.

The second terminal 4 is connected to the second network M. The second terminal 4 cannot communicate with the first network N.

The second terminal 4 includes an output unit 41. The output unit 41 outputs the read information added to a mail received from the mail server 2 according to an operation of the user. For example, the output unit 41 displays the read information.

The read information is information including the communication destination information indicating the communication destination. An output format of the read information is, for example, a one-dimensional barcode, a two-dimensional barcode, blinking of light or audio information, infrared communication data, or another format readable by the first terminal 3 without via the second network M.

The first terminal 3 is connected to the first network N. The first terminal 3 includes an information reading unit 31 and an output unit 32.

The information reading unit 31 reads the read information readable by a method not via the second network M. For example, when the read information is a one-dimensional barcode, a two-dimensional barcode, or blinking of light, the information reading unit 31 may be an imaging unit of a camera. When the read information is audio information or infrared communication data, the information reading unit 31 may be a sensor capable of reading the read information.

Further, the information reading unit 31 restores the read information that has been read to the communication destination information. The first terminal 3 may include an application capable of performing restoration to the communication destination information.

The information reading unit 31 may cause the output unit 32 to output the communication destination information restored from the read information.

The output unit 32 outputs information regarding communication with the communication destination indicated by the restored communication destination information, for example, information obtained from the communication destination.

Next, the information conversion device 1 of the present example embodiment will be described. The information conversion device 1 includes an extraction unit 11 and an output unit 12. The information conversion device 1 receives a mail addressed to a terminal (for example, addressed to the second terminal 4) connected to the second network M from a terminal of the transmission source of the mail via the second network M or the first network N.

The extraction unit 11 extracts the predetermined mail-related information from the mail received from the terminal of the transmission source of the mail.

The mail-related information is information related to the mail and is information predetermined as a target to be extracted from the mail. The mail-related information is, for example, the communication destination information indicating a communication destination included in a mail main body or a file attached to the mail.

In the present example embodiment, the mail-related information is assumed as the communication destination information indicating a communication destination outside the second network M, that is, a communication destination connected to a network other than the second network M. The communication destination information is information regarding a communication destination indicated by a URL, a telephone number, or the like included in the mail. In the present example embodiment, it is assumed that this communication destination cannot be communicated from the second network M and can be communicated from the first network N.

In the present example embodiment, the extraction unit 11 receives a mail addressed to a terminal connected to the second network M, and extracts the mail-related information from the received mail when the predetermined mail-related information (communication destination information indicating a communication destination outside the second network M) is included in the mail.

The output unit 12 converts the communication destination information of the communication destination related to the mail-related information into the read information readable by the first terminal 3 by the method not via the second network M, and outputs the mail to which the read information is added to the mail server 2. In a case of the present example embodiment, since the mail-related information is the communication destination information, the output unit 12 converts the communication destination information extracted from the mail into the read information. The output unit 12 may delete the mail-related information included in the mail.

The deletion of the mail-related information may be performed by either the extraction unit 11 or the output unit 12. In a case where the read information is added to the mail, the output unit 12 may embed the read information in the original mail main body or attach the read information as an attached file to the original mail.

The output unit 12 outputs, to the mail server 2, a mail that does not include the mail-related information at a time of reception and the mail to which the read information is added.

The configuration example of the information conversion system illustrated in FIG. 3 is an example. The information conversion device 1 may include a plurality of the extraction units 11 and a plurality of the output units 12 to distribute the processing for the mail.

By configuring the information conversion device 1 in this manner, the information conversion device 1 extracts the predetermined mail-related information from the received mail. Further, the information conversion device 1 converts the communication destination information of the communication destination related to the mail-related information into the read information, and outputs the mail to which the read information is added to the second terminal 4 via the mail server 2.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, the information conversion device 1 of the present example embodiment may delete the predetermined mail-related information from the received mail. Thus, the communication destination information of the communication destination that the second terminal 4 cannot communicate with can be prevented from being included in the mail referred to by the second terminal 4.

The output unit 32 of the first terminal 3 may output the communication destination information restored from the read information. This enables the user to check the communication destination information. Thus, the user can visually check reliability of the communication destination information.

Figure 4:
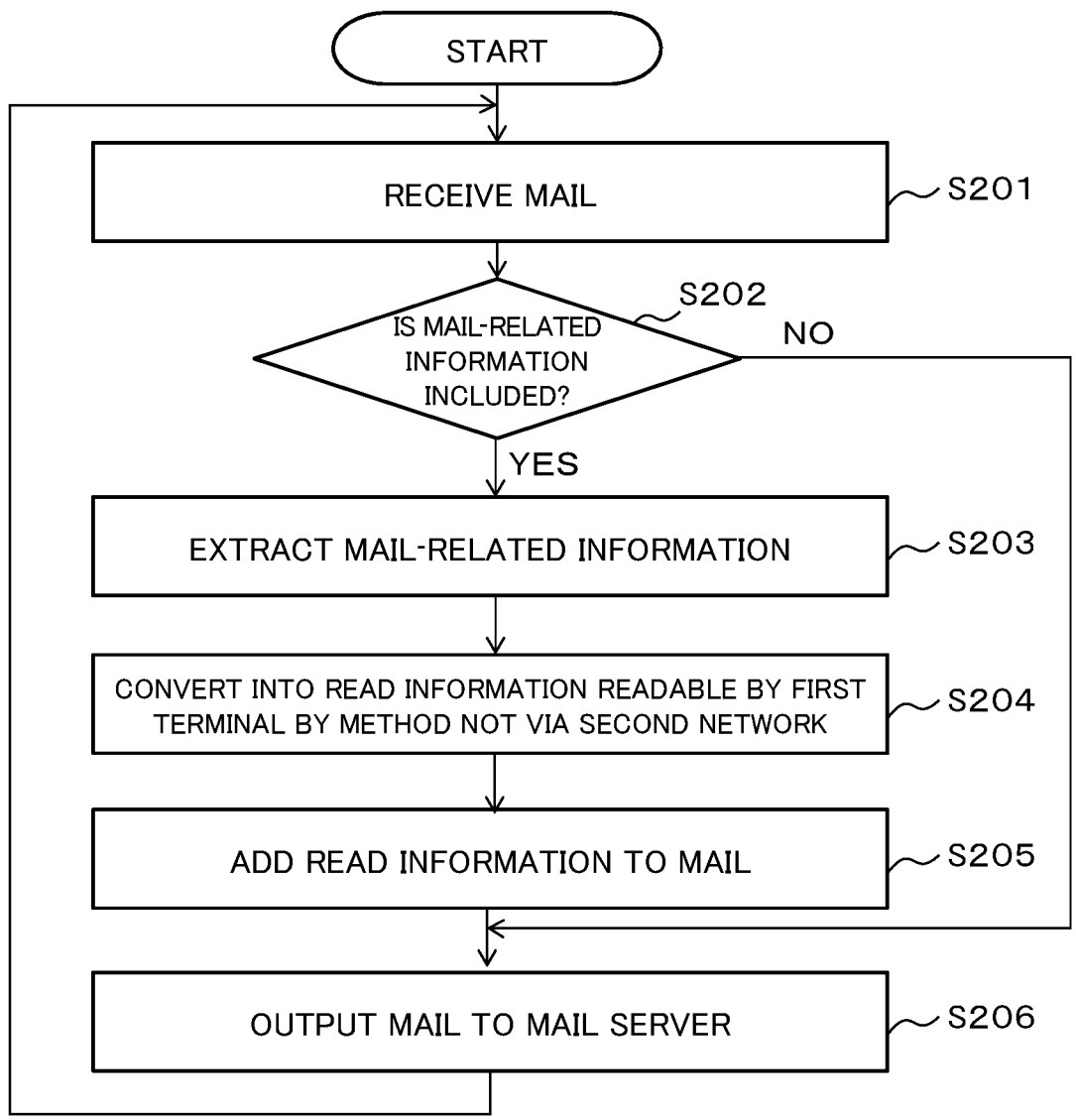
FIG. 4 is a flowchart illustrating an operation example of an information conversion device of the second example embodiment of the present invention.

Next, an operation example of the information conversion device 1 of the present example embodiment will be described using FIG. 4.

The extraction unit 11 receives a mail addressed to a terminal connected to the second network M (step S201) and, when the mail-related information is included in the mail (YES in step S202), extracts the predetermined mail-related information from the received mail (step S203). The extraction unit 11 outputs the mail-related information to the output unit 12.

When the mail-related information is not included in the mail (NO in step S202), the extraction unit 11 does not perform the operation of step S203. The output unit 12 does not perform the operations of step S204 and step S205.

In a case of the present example embodiment, since the mail-related information is the communication destination information, the output unit 12 converts the communication destination information into the read information readable by the first terminal 3 by the method not via the second network M (step S204).

Further, the output unit 12 adds the read information to the mail (step S205). The output unit 12 outputs the mail to which the read information is added to the mail server 2. (Step S206). The output unit 12 also outputs, to the mail server 2, a mail that does not include the mail-related information at a time of reception.

The output unit 12 may delete the mail-related information included in the original mail during any operation from step S203 to step S206.

Next, an operation example in a case where the first terminal 3 performs communication with the communication destination indicated by the communication destination information will be described using FIG. 5. A solid arrow illustrated in FIG. 5 indicates that the second terminal 4 reads a mail via the second network M. A dotted line illustrated in FIG. indicates that the first terminal 3 reads the read information by the method not via the second network M.

The second terminal 4 is connected to the second network M. Further, the second terminal 4 reads a mail stored in the mail server 2 according to an operation of the user (step S301).

Further, the output unit 41 of the second terminal 4 outputs the read information added to the mail received from the mail server 2 according to the operation of the user (step S302). For example, the output unit 41 displays the read information (a two-dimensional barcode or the like).

The first terminal 3 is connected to the first network N.

The information reading unit 31 of the first terminal 3 reads the read information output by the second terminal 4 according to the operation of the user by a method not via the second network M (step S303). For example, the information reading unit 31 has an image capturing function such as a camera function, and reads the read information (such as a two-dimensional barcode) displayed on the second terminal 4 by the image capturing function.

Further, the information reading unit 31 restores the read information that has been read to the communication destination information (step S304). The output unit 32 of the first terminal 3 may output (display, audio output, or the like) the restored communication destination information.

Based on the restored communication destination information, the first terminal 3 communicates with the communication destination indicated by the communication destination information via the first network N according to the operation of the user (step S305).

The output unit 32 of the first terminal 3 outputs information regarding communication with the communication destination indicated by the restored communication destination information, for example, information obtained from the communication destination (step S306).

By operating in this manner, the information conversion device 1 extracts the predetermined mail-related information from the received mail. Further, the information conversion device 1 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, in the second example embodiment of the present invention, the information conversion device 1 extracts the predetermined mail-related information from the received mail. Further, the information conversion device 1 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, the information conversion device 1 of the present example embodiment may delete the mail-related information from the received mail. Thus, it is possible to prevent the mail from including the communication destination information of the communication destination that the second terminal 4 cannot communicate with.

The output unit 32 of the first terminal 3 may output the communication destination information restored from the read information. This enables the user to check the communication destination information.

Third Example Embodiment

Next, an information conversion device 5 according to a third example embodiment of the present invention will be specifically described. The information conversion device 5 of the present example embodiment verifies safety of communication with a communication destination indicated by communication destination information.

In the present example embodiment, the mail-related information is assumed as the communication destination information.

Figure 6:
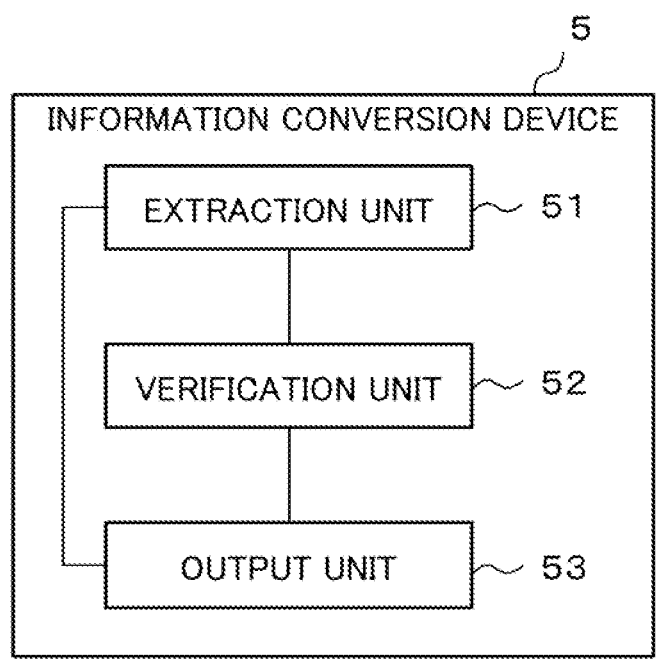
FIG. 6 is a diagram illustrating a configuration example of an information conversion device of a third example embodiment of the present invention.

FIG. 6 is a block diagram illustrating a configuration example of the information conversion device 5 of the present example embodiment. The configuration example of the information conversion system of the present example embodiment is obtained by changing the information conversion device 1 of the configuration example of FIG. 3 to the information conversion device 5 of FIG. 6.

In the present example embodiment, in a case of a secure communication destination, a terminal connected to the second network M can communicate with a communication destination not included in the second network M.

The information conversion device 5 of the present example embodiment includes an extraction unit 51, a verification unit 52, and an output unit 53.

The extraction unit 51 extracts predetermined mail-related information from a received mail. The extraction unit 51 of the present example embodiment receives a mail addressed to a terminal connected to the second network M, and extracts the predetermined mail-related information from the received mail when mail-related information is included in the mail. In a case of the present example embodiment, since the mail-related information is the communication destination information, the extraction unit 51 extracts the communication destination information from the mail.

When the extraction unit 51 has extracted the communication destination information, the verification unit 52 verifies safety of communication with the communication destination indicated by the extracted communication destination information.

As a safety verification method, for example, any one of the following methods can be considered.

(1) The information conversion device 5 stores a collation list that is a list of the communication destination information of communication destinations outside the second network M with which communication from the second network M is permitted. Then, the verification unit 52 collates the collation list with the communication destination information extracted by the extraction unit 51.

(2) A device other than the information conversion device 5 includes the above-described collation list, and the verification unit 52 collates the collation list with the communication destination information extracted by the extraction unit 51.

(3) The verification unit 52 communicates with the communication destination indicated by the communication destination information extracted by the extraction unit 51 and verifies the safety.

In addition to these methods, any method can be used as the safety verification method. The collation list may be a list of the communication destination information of communication destinations outside the second network M with which communication from the second network M is not permitted (prohibited). In this case, when the communication destination information extracted by the extraction unit 51 is not included in the collation list, the verification unit 52 determines that the communication with the communication destination information is safe.

It is assumed that the verification unit 52 of the present example embodiment verifies the safety by collating the collation list stored in the information conversion device 5 with the communication destination information extracted by the extraction unit 51 (method (1)). Other methods (methods (2) and (3)) will be described later (fourth example embodiment).

It is assumed that the information conversion device 5 of the present example embodiment stores the collation list in a storage unit in the device in advance. The collation list may be set by an administrator or the like of the information conversion device 5.

When the communication with the communication destination indicated by the communication destination information extracted by the extraction unit 51 is safe, the verification unit 52 of the present example embodiment outputs the mail including the communication destination information to the output unit 53 without converting the communication destination information into read information.

When the communication with the communication destination indicated by the communication destination information extracted by the extraction unit 51 is not safe, the verification unit 52 outputs the received mail and the extracted communication destination information to the output unit 53.

When the mail received by the extraction unit 51 and the extracted communication destination information are received from the verification unit 52, the output unit 53 converts the communication destination information into read information readable by the first terminal 3 by a method not via the second network M. Further, the output unit 53 outputs the mail to which the read information is added to the mail server 2. The output unit 53 also outputs, to the mail server 2, a mail that does not include the mail-related information at a time of reception by the extraction unit 51, and a mail that includes safe communication destination information as the mail-related information.

By configuring the information conversion device 5 in this manner, the information conversion device 5 extracts the predetermined mail-related information from the received mail. Further, the information conversion device 5 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, when the communication with the communication destination indicated by the communication destination information is not safe, the information conversion device 5 of the present example embodiment stores not the communication destination information but a mail including the read information of the communication destination information in the mail server. Further, when the information conversion device 5 deletes the mail-related information from the received mail, the second terminal 4 cannot communicate with the communication destination using the communication destination information. Thus, it is possible to reduce a risk that the second terminal 4 becomes a route of infection of a computer virus or information leakage due to infection of a virus.

When the communication with the communication destination indicated by the communication destination information is safe, the information conversion device 5 of the present example embodiment stores a mail including the communication destination information in the mail server 2. Thus, when the communication with the communication destination indicated by the communication destination information is safe, the second terminal 4 can communicate with the communication destination using the communication destination information included in the mail without using the first terminal 3. Thus, the user can more easily communicate with the communication destination indicated by the communication destination information.

Next, an operation example of the information conversion device 5 of the present example embodiment will be described using FIG. 7.

The extraction unit 51 receives a mail addressed to a terminal connected to the second network M (step S401) and, when the mail-related information is included in the mail (YES in step S402), extracts the predetermined mail-related information from the received mail. In the present example embodiment, the mail-related information is the communication destination information. The extraction unit 51 outputs the communication destination information and the mail, which are the mail-related information, to the verification unit 52 (step S403).

When the mail-related information is not included in the mail (NO in step S402), the extraction unit 51 does not perform the operation of step S403, and the verification unit 52 does not perform the operation of step S404. The output unit 53 does not perform the operations of step S405 and step S406. In this case, the extraction unit 51 outputs the received mail to the output unit 53.

The verification unit 52 verifies the safety of the communication with the communication destination indicated by the communication destination information extracted by the extraction unit 51 by collating whether the communication destination information extracted by the extraction unit 51 is included in the collation list provided in the information conversion device 5.

When it is determined that the communication with the communication destination indicated by the communication destination information is safe (YES in step S404), the verification unit 52 outputs a mail including the communication destination information to the output unit 53.

When the verification unit 52 determines that the communication with the communication destination indicated by the communication destination information is safe, the output unit 53 does not convert the communication destination information into the read information.

When the verification unit 52 determines that the communication with the communication destination indicated by the communication destination information is not safe (NO in step S404), the output unit 53 converts the communication destination information into the read information readable by the first terminal 3 by the method not via the second network M (step S405). The output unit 53 adds the read information to the mail (step S406). Further, the output unit 53 outputs the mail to which the read information is added to the mail server 2 (step S407). The output unit 53 also outputs a mail that does not include the mail-related information at a time of reception by the extraction unit 51, and a mail that includes the communication destination information indicating a safe communication destination as the mail-related information.

By operating in this manner, the information conversion device 5 extracts the predetermined mail-related information from the received mail. Further, the information conversion device 5 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, in the third example embodiment of the present invention, the information conversion device 5 extracts the predetermined mail-related information from the received mail. Further, the information conversion device 5 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

When the communication with the communication destination indicated by the communication destination information is safe, the information conversion device 5 of the present example embodiment does not convert the communication destination information included in the mail into the read information. Thus, when the communication destination indicated by the communication destination information included in the mail is safe, the second terminal 4 connected to the second network M that has received the mail can directly communicate with the communication destination indicated by the communication destination information.

When the communication with the communication destination indicated by the communication destination information is not safe, the information conversion device 5 of the present example embodiment stores not the communication destination information but a mail including read information of the communication destination information in the mail server 2. Thus, when the communication destination indicated by the communication destination information is not safe, the first terminal 3 can perform the communication with the communication destination indicated by the communication destination information based on the read information. Thus, the user can easily refer to information of the communication destination indicated by the communication destination information included in the mail.

Fourth Example Embodiment

Next, an information conversion system according to a fourth example embodiment of the present invention will be specifically described. As in the third example embodiment, an information conversion device 5 of the present example embodiment verifies safety of communication with a communication destination indicated by communication destination information, and converts the communication destination information into read information based on a verification result.

In the third example embodiment, the method (1) of verifying the safety based on the collation list provided in the information conversion device 5 has been described, but in the present example embodiment, the other methods (2) and (3) will be described.

In the present example embodiment, the mail-related information is assumed as the communication destination information.

Figure 8:
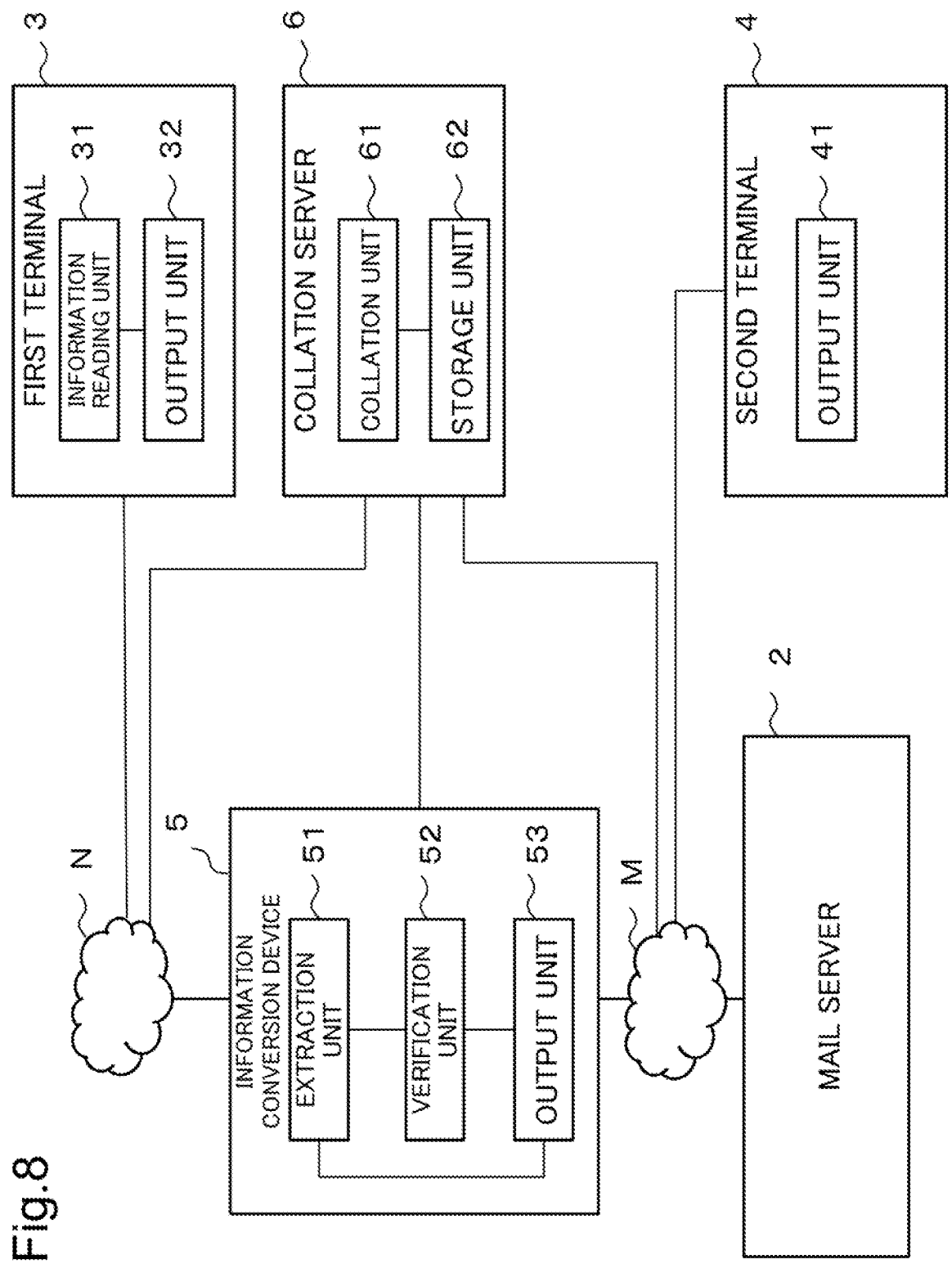
FIG. 8 is a diagram illustrating a configuration example of an information conversion system of a fourth example embodiment of the present invention.

FIG. 8 illustrates a configuration example of the information conversion system of the present example embodiment. The information conversion system of the present example embodiment includes a first network N, a second network M, an information conversion device 5, a mail server 2, a first terminal 3, a second terminal 4, and a collation server 6.

In the present example embodiment, the first network N is assumed as a network that cannot communicate with the second network M.

In the present example embodiment, the second network M is assumed as a network that cannot communicate with the communication destination indicated by the communication destination information not included in the collation list stored in a storage unit 62 of the collation server 6.

When a terminal connected to the second network M desires communication with a communication destination outside the second network M, the collation server 6 performs collation as to whether communication with the communication destination is possible based on the collation list. The collation server 6 includes a collation unit 61 and a storage unit 62.

The collation unit 61 collates the communication destination information included in the collation list with the communication destination information of the communication destination with which the second terminal 4 connected to the second network M communicates. Then, as a result of the collation, when the communication destination information of the communication destination with which the second terminal 4 communicates is included in the collation list, the second terminal 4 is permitted to communicate with the communication destination.

The storage unit 62 stores the collation list. The collation list is a list of the communication destination information of communication destinations outside the second network M with which communication from the second network M is permitted. The collation list may be a list of communication destination information of communication destinations with which communication is not permitted. In this case, when the communication destination information of the communication destination with which the second terminal 4 communicates is not included in the collation list, the collation unit 61 permits the second terminal 4 to communicate with the communication destination.

Next, the information conversion device 5 of the present example embodiment will be described. The information conversion device 5 includes an extraction unit 51, a verification unit 52, and an output unit 53.

The extraction unit 51 extracts predetermined mail-related information from a received mail. The extraction unit 51 of the present example embodiment receives a mail addressed to a terminal connected to the second network M, and extracts the predetermined mail-related information from the received mail when the predetermined mail-related information is included in the mail. In a case of the present example embodiment, since the mail-related information is the communication destination information, the extraction unit 51 extracts the communication destination information from the mail.

When the extraction unit 51 has extracted the communication destination information, the verification unit 52 verifies the safety of the communication with the communication destination indicated by the communication destination information.

In the present example embodiment, the verification unit 52 verifies the safety by the method (2) or (3) among the safety verification methods described in the third example embodiment.

First, a case of verifying the safety by the method (2) will be described.

The method (2) is a method in which a device other than the information conversion device 5 includes a collation list, and the verification unit 52 collates the collation list with the communication destination information extracted by the extraction unit 51.

The collation list is a list of the communication destination information of communication destinations outside the second network M with which communication from the second network M is permitted. In the present example embodiment, it is assumed that the collation server 6 includes the collation list. The collation list may be a list of the communication destination information of communication destinations outside the second network M with which communication from the second network M is not permitted (prohibited).

The verification unit 52 collates the communication destination information included in the collation list stored in the storage unit 62 of the collation server 6 with the communication destination information extracted by the extraction unit 51.

When the communication destination information extracted by the extraction unit 51 is included in the collation list, that is, when the communication with the communication destination indicated by the communication destination information extracted by the extraction unit 51 is permitted, the verification unit 52 outputs the mail to the output unit 53 without converting the communication destination information into the read information.

When the communication destination indicated by the communication destination information is not included in the collation list, that is, when the communication with the communication destination indicated by the communication destination information extracted by the extraction unit 51 is not permitted, the verification unit 52 outputs the received mail and the extracted communication destination information to the output unit 53.

Next, a case of verifying the safety by the method (3) will be described.

The method (3) is a method in which the verification unit 52 communicates with the communication destination indicated by the communication destination information extracted by the extraction unit 51 and verifies the safety.

For example, when the verification unit 52 actually communicates with the communication destination indicated by the communication destination information extracted by the extraction unit 51 and detects an abnormal operation such as virus infection, the verification unit 52 determines that the communication with the communication destination indicated by the communication destination information is not safe.

The verification unit 52 may be restricted from communicating with a file or a directory, communicating with other than the communication destination indicated by the communication destination information to be verified, performing an operation, executing a mail, and the like.

When it is determined that the communication with the communication destination indicated by the communication destination information is safe, the verification unit 52 requests the collation server 6 to add the communication destination information to the collation list.

The verification unit 52 may verify the safety by combining any two or more of the verification methods (1), (2), and (3).

Specifically, for example, in a case where the method (1) or (2) and the method (3) are combined, the verification unit 52 first verifies whether the communication destination information extracted by the extraction unit 51 is included in the collation list. When the communication destination information is not included in the collation list, the verification unit 52 may perform the communication with the communication destination indicated by the communication destination information and verify the safety of the communication with the communication destination indicated by the communication destination information.

By configuring the information conversion device 5 in this manner, the information conversion device 5 extracts the predetermined mail-related information from the received mail. Further, the information conversion device 5 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, when verifying the safety by the method (3), the information conversion device 5 of the present example embodiment communicates with the communication destination indicated by the communication destination information extracted by the extraction unit 51 and verifies the safety. Thus, even when the communication destination information extracted from the mail is not included in the collation list, the verification unit 52 can verify the safety of the communication with the communication destination indicated by the communication destination information.

The information conversion device 5 of the present example embodiment may reflect the communication destination information of the communication destination verified as being safe by the method (3) in the collation list. In this case, the collation server 6 can permit communication between the communication destination verified to be safe and the second terminal 4.

When performing verification by combining the method (1) or (2) and the method (3), the information conversion device 5 of the present example embodiment verifies the safety of the communication with the communication destination indicated by the communication destination information not included in the collation list by the method (3). Then, when the communication with the communication destination indicated by the communication destination information is safe, the information conversion device 5 adds the communication destination information to the collation list of the collation server 6.

Thus, in a case where the safety of the communication with the communication destination indicated by the communication destination information is verified again, the information conversion device 5 can perform verification by the method (1) or (2). Consequently, the information conversion device 5 does not need to perform verification by the method (3). Therefore, verification can be efficiently performed.

Next, an operation example of the information conversion system of the present example embodiment will be described using FIG. 9.

Figure 9:
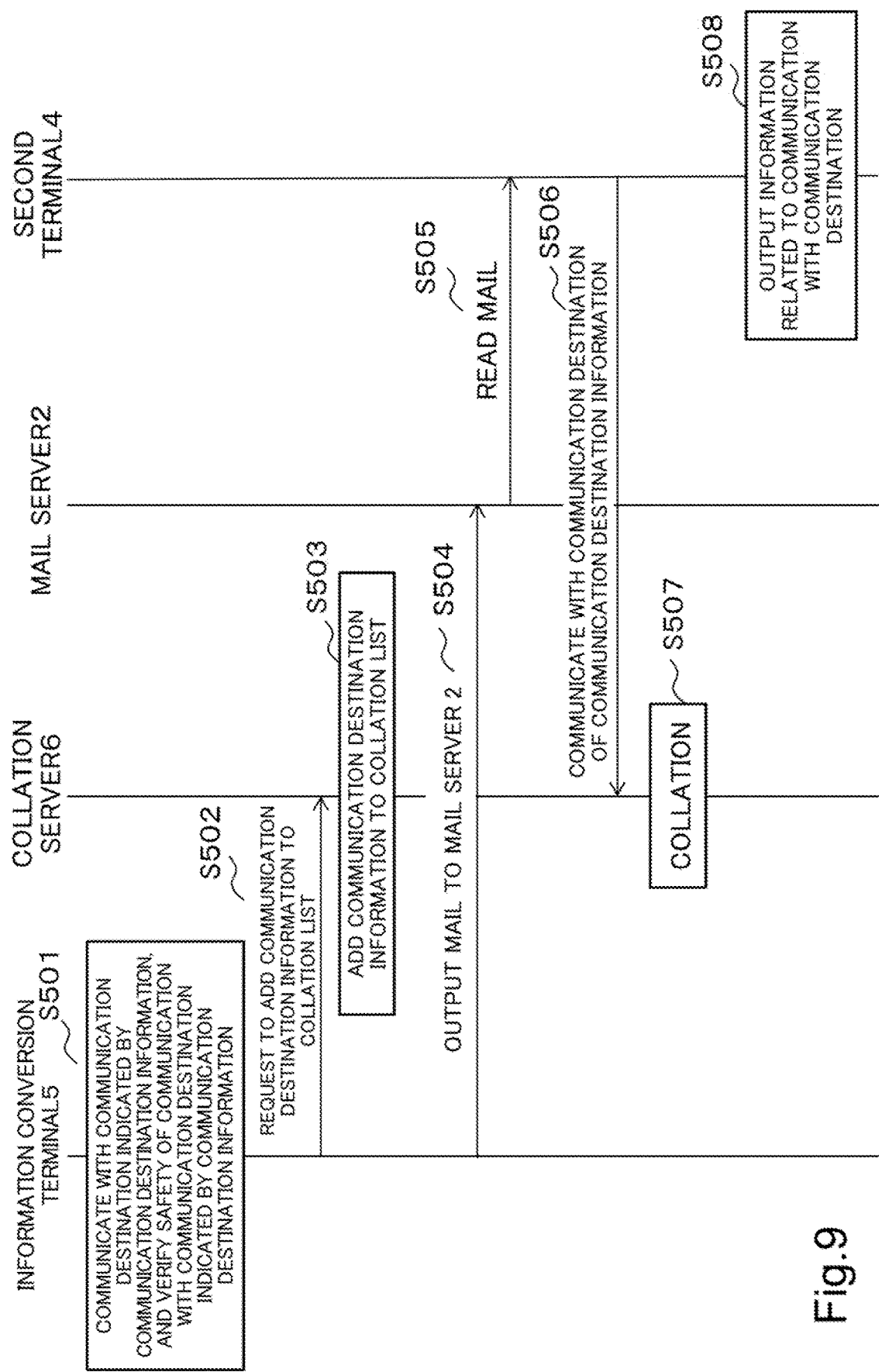
FIG. 9 is a diagram illustrating an operation example of the information conversion system of the fourth example embodiment of the present invention.

The operation example of FIG. 9 is an operation example in a case where the information conversion device 5 verifies the safety by the above-described method (3).

Figure 7:
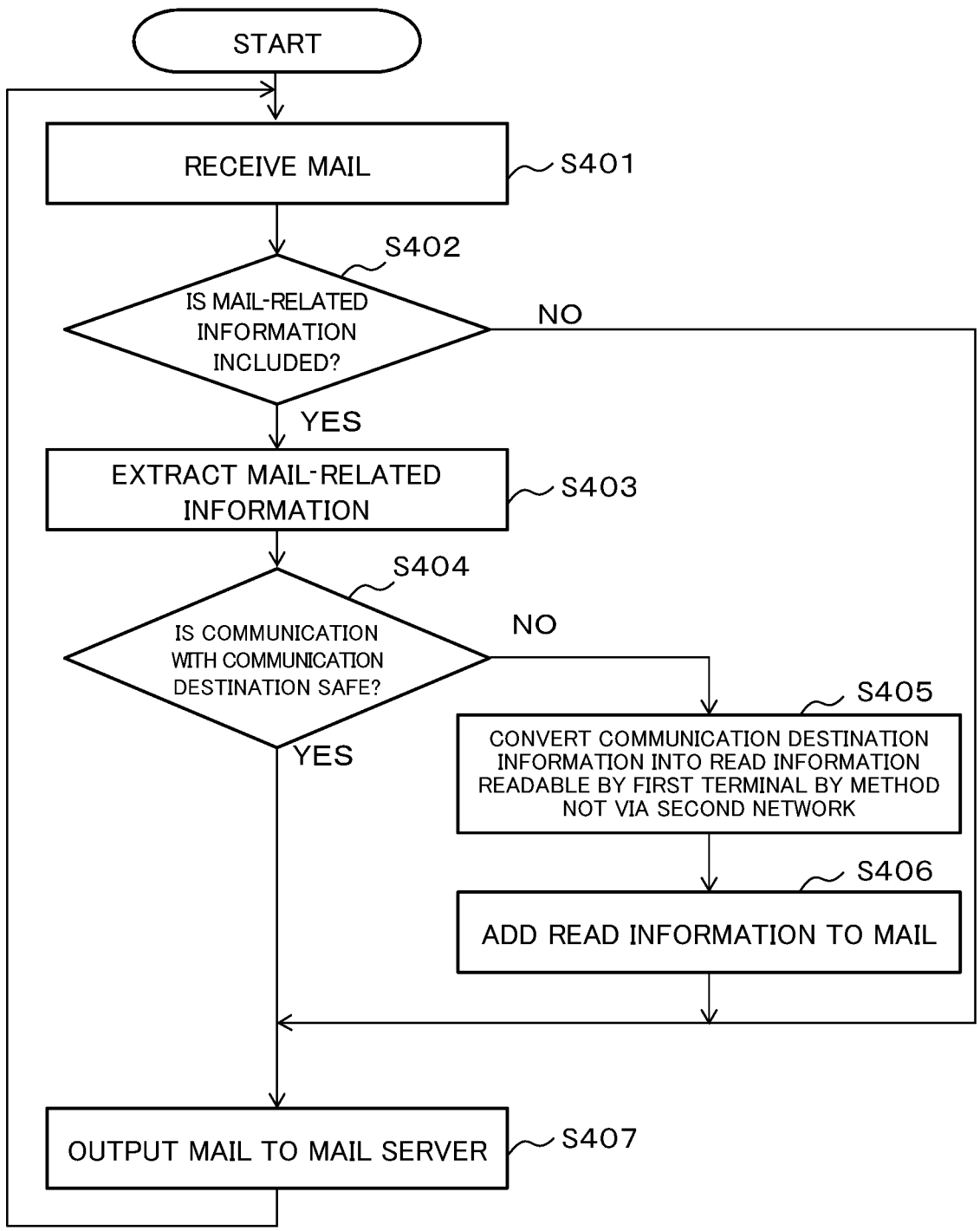
FIG. 7 is a flowchart illustrating an operation example of the information conversion device of the third example embodiment of the present invention.

The operation example (verification by the method (3)) of the information conversion system of the present example embodiment is different from the operation example of the information conversion device (verification by the method (1)) of the third example embodiment illustrated in FIG. 7 in the operation of the verification unit 52 after the operation. Since the operations from step S401 to step S403 in the third example embodiment are similar to those in the third example embodiment, description of the operations from step S401 to step S403 in the operation of the information conversion device 5 is omitted.

After the information conversion device 5 performs a series of operations from step S401 to step S403 in the operation example (FIG. 7) of the information conversion device 5 of the third example embodiment, the information conversion system of the present example embodiment performs the operation illustrated in FIG. 9. When the determination in step S404 of FIG. 7 is NO, the information conversion device 5 of the present example embodiment performs the operations of steps S405 to S407.

The verification unit 52 of the information conversion device 5 performs verification in a case where the communication destination information is included as the mail-related information in the mail received by the extraction unit 51. The verification unit 52 verifies the safety of the communication with the communication destination indicated by the communication destination information by communicating with the communication destination indicated by the communication destination information extracted by the extraction unit 51 (step S501). This operation is equivalent to the verification of the safety in step S404 in FIG. 7.

When it is determined that the communication with the communication destination indicated by the communication destination information is safe, the verification unit 52 requests the collation server 6 to add, to the collation list, the communication destination information of the communication destination for which the communication with the communication destination is verified to be safe (step S502).

Based on the request from the verification unit 52, the collation server 6 adds the communication destination information for which the communication with the communication destination is verified to be safe to the collation list stored in the storage unit 62 (step S503).

When the communication destination information requested to be added to the collation list is included in the collation list, the collation server 6 may not add the communication destination information to the collation list.

The verification unit 52 outputs the mail including the communication destination information to the output unit 53. The output unit 53 outputs the mail including the communication destination information to the mail server 2 (step S504).

The second terminal 4 reads the mail from the mail server 2 according to the operation of the user (step S505). Further, the second terminal 4 requests the collation server 6 to communicate with the communication destination indicated by the communication destination information according to the operation of the user. (Step S506).

When communication with a communication destination outside the second network M is requested from the second terminal 4 connected to the second network M, the collation server 6 performs collation. The collation server 6 collates the communication destination information of the communication destination for which the second terminal 4 requests communication with the communication destination information of the communication destination permitted to communicate, which is included in the collation list (step S507).

When the communication destination information of the communication destination with which the second terminal 4 communicates is included in the collation list as a result of the collation, the collation unit 61 permits the second terminal 4 to communicate with the communication destination outside the second network M.

When the communication is permitted, the second terminal 4 communicates with the communication destination indicated by the communication destination information via the first network N. The output unit 41 of the second terminal 4 outputs information regarding the communication with the communication destination indicated by the communication destination information, for example, information obtained from the communication destination (step S508).

By operating in this manner, the information conversion device 5 extracts the predetermined mail-related information from the received mail. Further, the information conversion device 5 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, in the fourth example embodiment of the present invention, the information conversion device 5 extracts predetermined mail-related information from the received mail. Further, the information conversion device 5 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

When verifying the safety by the method (3), the information conversion device 5 of the present example embodiment communicates with the communication destination indicated by the communication destination information extracted by the extraction unit 51 and verifies the safety. Thus, even when the communication destination information extracted from the mail is not included in the collation list, the verification unit 52 can verify the safety of the communication with the communication destination indicated by the communication destination information.

The information conversion device 5 of the present example embodiment may reflect the communication destination information of the communication destination verified as being safe by the method (3) in the collation list. In this case, the collation server 6 can permit communication between the communication destination verified to be safe and the second terminal 4.

When performing verification by combining the method (1) or (2) and the method (3), the information conversion device 5 of the present example embodiment verifies the safety of the communication with the communication destination indicated by the communication destination information not included in the collation list by the method (3). Then, when the communication with the communication destination indicated by the communication destination information is safe, the information conversion device 5 adds the communication destination information to the collation list of the collation server 6.

Thus, in a case where the safety of the communication with the communication destination indicated by the communication destination information is verified again, the information conversion device 5 can perform verification by the method (1) or (2). Then, the information conversion device 5 does not need to perform verification by the method (3). Therefore, verification can be efficiently performed.

Fifth Example Embodiment

Next, an information conversion system according to a fifth example embodiment of the present invention will be specifically described. The information conversion device 5 of the present example embodiment extracts an attached file as mail-related information.

In the present example embodiment, the mail-related information is an attached file. The communication destination information of a communication destination regarding the mail-related information indicates a storage destination of the attached file of a storage server 8 as the communication destination.

Figure 10:
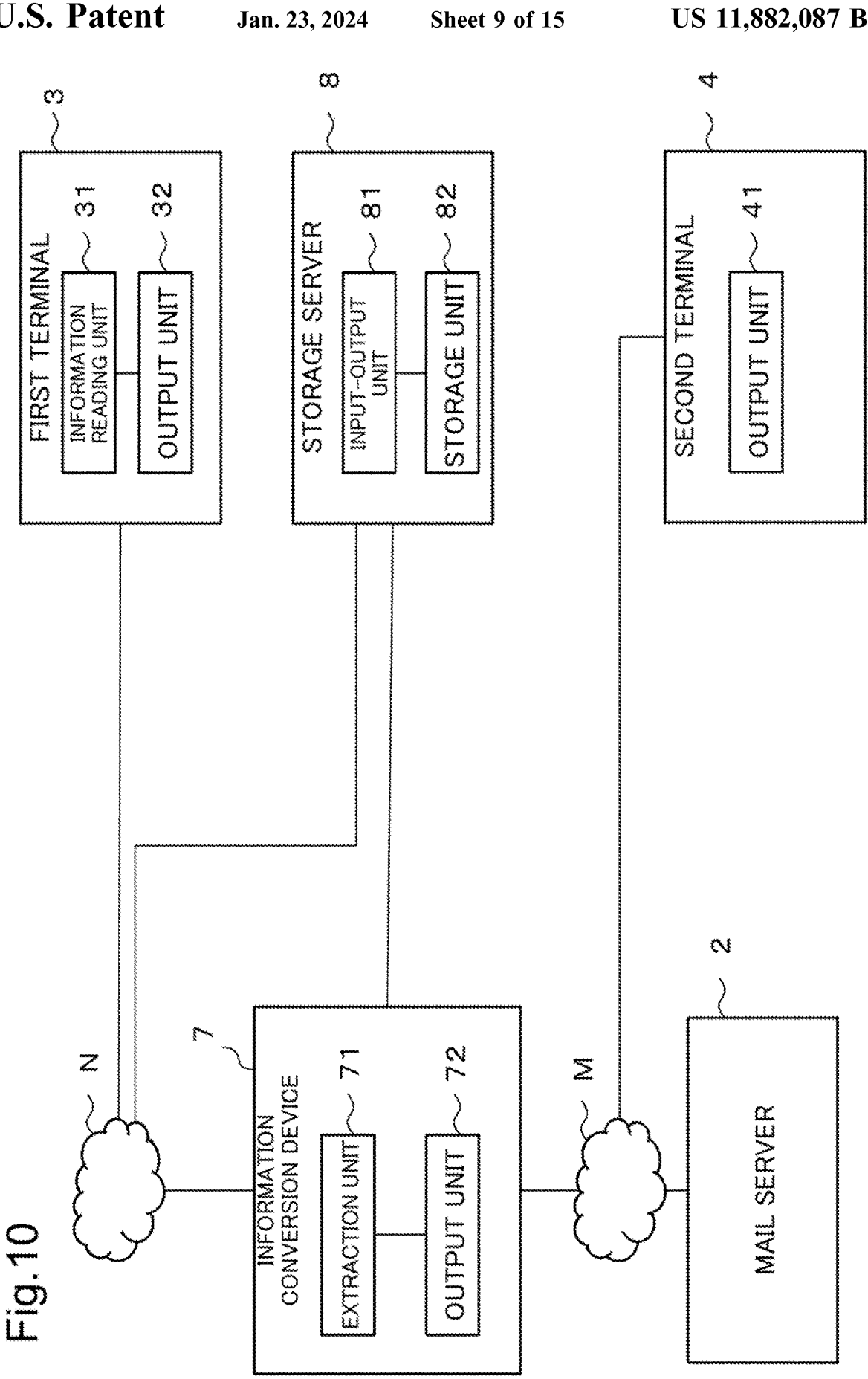
FIG. 10 is a diagram illustrating a configuration example of an information conversion system of a fifth example embodiment of the present invention.

FIG. 10 illustrates a configuration example of the information conversion system of the present example embodiment. The information conversion system of the present example embodiment includes a first network N, a second network M, an information conversion device 7, a mail server 2, a first terminal 3, a second terminal 4, and a storage server 8.

In the present example embodiment, the first network N is assumed as a network that cannot communicate with the second network M.

The second network M is assumed as a network that cannot communicate with the first network N.

The storage server 8 is a storage destination of the mail-related information. The storage server 8 stores the mail-related information extracted from a mail addressed to a terminal connected to the second network M. The storage server 8 includes an input-output unit 81 and a storage unit 82.

The input-output unit 81 stores the mail-related information in the storage destination determined by the extraction unit 71 of the information conversion device 7. The extraction unit 71 designates the storage unit 82 of the storage server 8 as a storage destination. The extraction unit 71 may designate a predetermined area of the storage unit 82 as a storage destination. When the storage server 8 includes a plurality of storage units 82, the extraction unit 71 may designate any one of the storage units 82.

When reading of the mail-related information is requested from the first terminal 3, the input-output unit 81 outputs the mail-related information based on the communication destination information indicating the storage destination.

The storage unit 82 stores the mail-related information.

Next, the information conversion device 7 of the present example embodiment will be described. The information conversion device 7 includes an extraction unit 71 and an output unit 72.

The extraction unit 71 extracts predetermined mail-related information from the received mail. In the present example embodiment, the mail-related information is assumed as an attached file included in a mail.

In the present example embodiment, the extraction unit 71 receives a mail addressed to a terminal connected to the second network M, and extracts the predetermined mail-related information from the received mail when the mail-related information is included in the mail.

When an attached file that is the predetermined mail-related information has been extracted, the extraction unit 71 of the present example embodiment deletes the attached file from the original mail.

Consequently, the second terminal 4 receives the mail not including the attached file from the mail server 2. Therefore, the second terminal 4 cannot refer to the attached file. Thus, it is possible to reduce the risk of becoming a route of infection of a computer virus or information leakage due to infection of a virus by the second terminal 4 referring to the mail-related information.

Further, the extraction unit 71 determines a storage destination of the mail-related information stored in the storage unit 82 of the storage server 8, and creates communication destination information (URL or the like) indicating the storage destination. In the present example embodiment, the communication destination information of the communication destination related to the mail-related information is communication destination information indicating the storage destination of the mail-related information.

Alternatively, the storage server 8 may determine the storage destination of the mail-related information, and the storage server 8 may output information indicating the storage destination to the extraction unit 71.

Further, the extraction unit 71 outputs the extracted mail-related information to the storage server 8.

In a case where a plurality of pieces of the mail-related information (attached files) is attached to the mail, the extraction unit 71 may determine the storage destination of the mail-related information in units of mails, or may determine the storage destination for each piece of the mail-related information.

Further, when a plurality of pieces of the mail-related information is stored in the same storage destination, the storage server 8 may store a list of the mail-related information together with the mail-related information. When the first terminal 3 communicates with the communication destination (storage destination) indicated by the communication destination information and the list of the mail-related information is included in the storage destination, the output unit 32 of the first terminal 3 may output the list of the mail-related information. The first terminal 3 may request the storage server 8 to read the mail-related information selected by the user.

The output unit 72 converts the communication destination information of the communication destination related to the mail-related information created by the extraction unit 71 into read information readable by a method not via the second network M by the first terminal 3, which is not connected to the second network M to which the second terminal 4 that receives the mail is connected. Further, the output unit 72 outputs the mail to which the read information is added to the mail server 2. The output unit 72 also outputs, to the mail server 2, the mail to which the mail-related information is not attached at a time of reception by the extraction unit 71.

By configuring the information conversion device 7 in this manner, the information conversion device 7 extracts the predetermined mail-related information from the received mail. Further, the information conversion device 7 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, the information conversion device 7 of the present example embodiment stores the mail-related information in the storage server 8, converts the communication destination information indicating the storage destination of the mail-related information into the read information, and adds the read information to the mail. Thus, the first terminal 3 can refer to the mail-related information without via the second terminal 4.

The information conversion device 7 of the present example embodiment deletes the attached file that is the mail-related information from the original mail. Consequently, the second terminal 4 receives the mail not including the attached file from the mail server 2. Thus, the second terminal 4 cannot refer to the attached file included in the original mail.

Thus, it is possible to reduce the risk of becoming a route of infection of a computer virus or information leakage due to infection of a virus by the second terminal 4 referring to the mail-related information.

Figure 11:
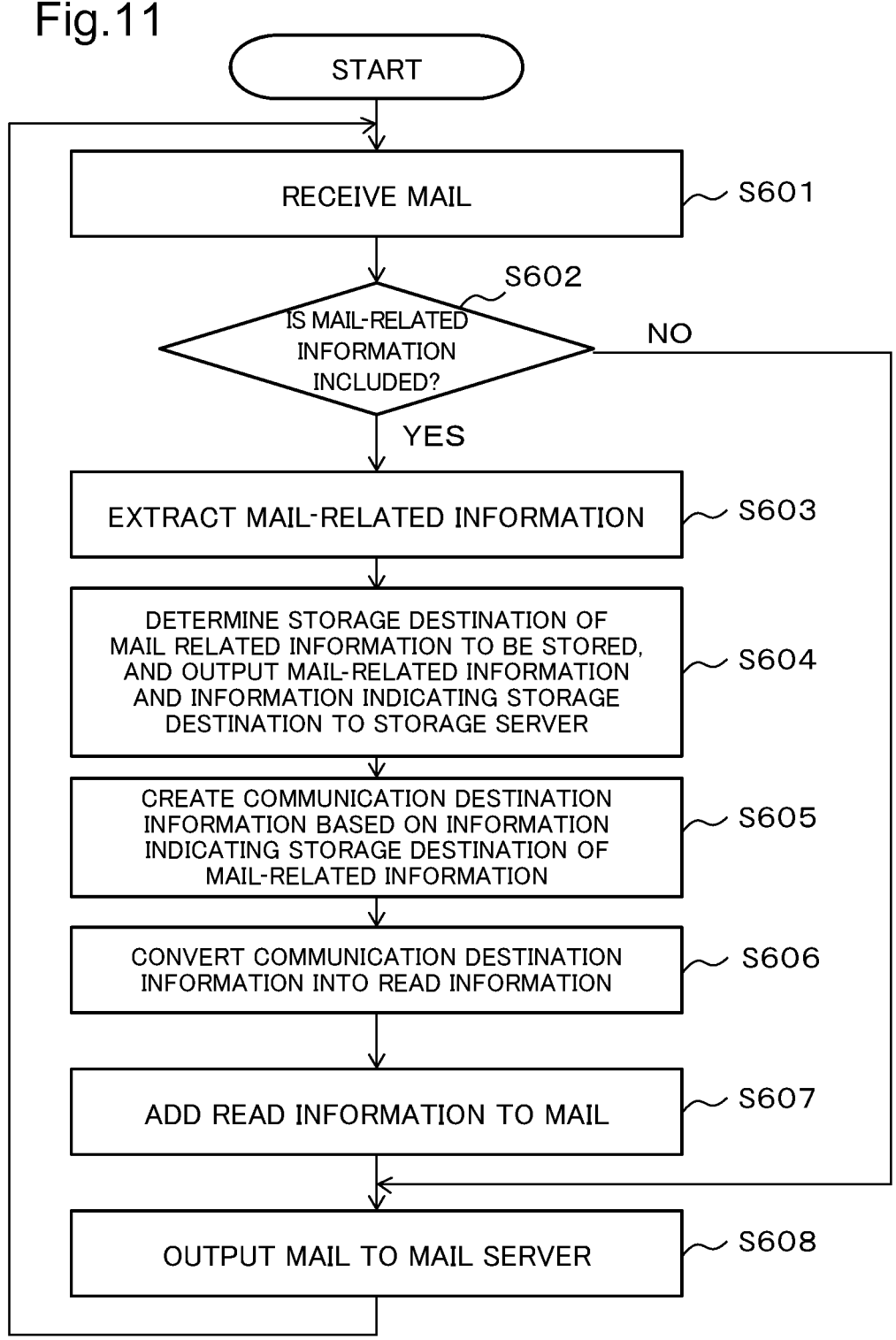
FIG. 11 is a flowchart illustrating an operation example of an information conversion device of the fifth example embodiment of the present invention.

Next, an operation example of the information conversion device 7 of the present example embodiment will be described using FIG. 11.

The extraction unit 71 of the information conversion device 7 receives a mail addressed to a terminal connected to the second network M (step S601) and, when the mail-related information is included in the mail (YES in step S602), extracts predetermined mail-related information from the received mail (step S603). When an attached file that is the predetermined mail-related information has been extracted, the extraction unit 71 deletes the attached file from the original mail.

When the mail-related information is not included in the mail (NO in step S602), the extraction unit 71 does not perform the operations of steps S603 to S605. The output unit 72 does not perform the operations of step S606 and step S607.

Further, the extraction unit 71 determines the storage destination of the mail-related information (attached file) stored in the storage server 8. The extraction unit 71 outputs the extracted mail-related information and information indicating the storage destination to the storage server 8 (step S604).

The extraction unit 71 creates the communication destination information indicating the storage destination based on the information indicating the storage destination of the mail-related information output to the storage server 8 (step S605).

The communication destination information indicating the storage destination of the mail-related information may be a URL.

The input-output unit 81 of the storage server 8 stores the mail-related information in the storage unit 82 based on the information indicating the storage destination determined by the extraction unit 71. In a case of the present example embodiment, the mail-related information is an attached file, and the communication destination related to the mail-related information is a storage destination of the attached file.

The output unit 72 of the information conversion device 7 converts the communication destination information created by the extraction unit 71 into the read information readable by the first terminal 3 by the method not via the second network M (step S606).

Further, the output unit 72 adds the read information to the mail (step S607), and outputs the mail to the mail server 2 (step S608). The output unit 72 also outputs, to the mail server 2, a mail that does not include the mail-related information at a time of reception by the extraction unit 71.

Next, an operation example in which the first terminal 3 of the present example embodiment communicates with the communication destination indicated by the communication destination information using the read information and refers to the mail-related information will be described using FIG. 12. A solid arrow illustrated in FIG. 12 indicates that the second terminal 4 reads a mail via the second network M, or that the first terminal 3 communicates with the storage server 8 via the first network N and reads the mail-related information. A dotted line illustrated in FIG. 12 indicates that the first terminal 3 reads the read information by the method not via the second network M.

Figure 5:
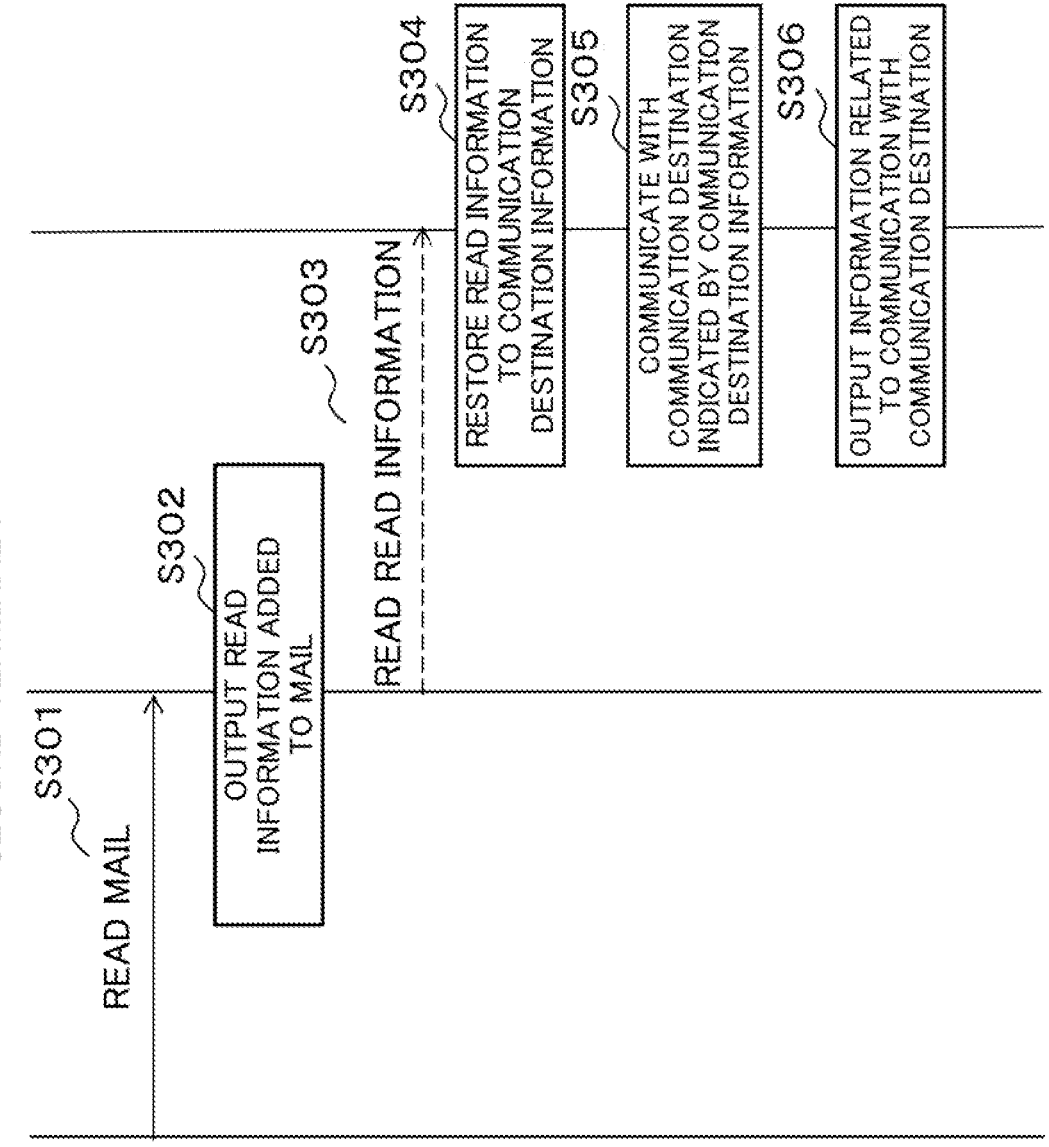
FIG. 5 is a diagram illustrating an operation example of the information conversion system of the second example embodiment of the present invention.
Figure 12:
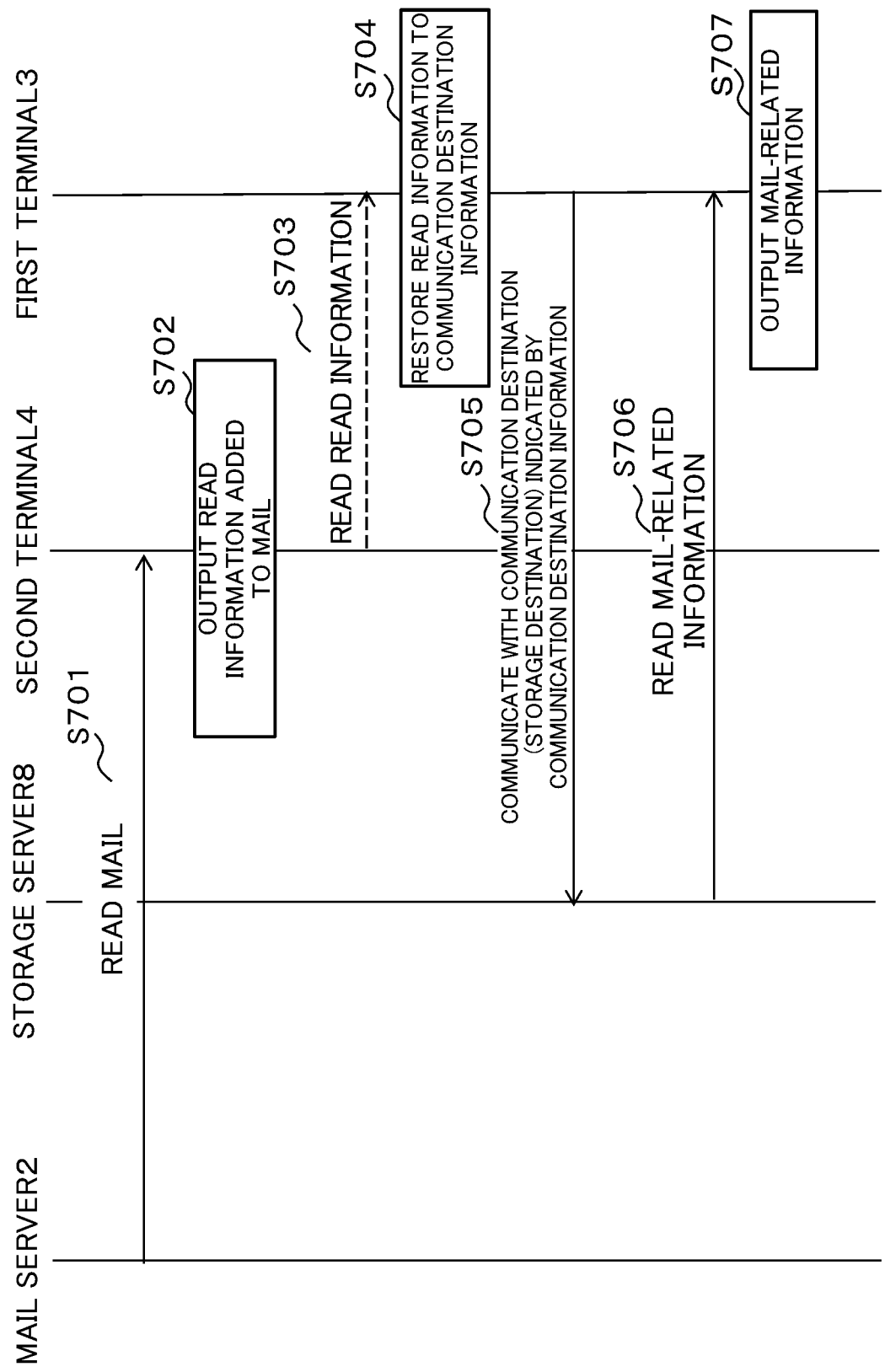
FIG. 12 is a diagram illustrating an operation example of the information conversion system of the fifth example embodiment of the present invention.

The operation example of the information conversion system illustrated in FIG. 12 is different from FIG. 5 that is an operation example of the information conversion system of the second example embodiment in that the first terminal 3 communicates with the communication destination information indicating the storage destination of the mail-related information (step S705 and step S706). The other operations are similar to those of the second example embodiment unless otherwise specified.

The second terminal 4 is connected to the second network M. According to an operation of the user, the second terminal 4 reads a mail stored in the mail server 2 (step S701).

Further, the output unit 41 of the second terminal 4 outputs the read information added to the mail received from the mail server 2 according to the operation of the user (step S702). The output unit 41 of the second terminal 4 displays, for example, the read information.

The first terminal 3 is connected to the first network N.

The information reading unit 31 of the first terminal 3 reads the read information output from the second terminal 4 by the method not via the second network M according to the operation of the user (step S703).

Further, the information reading unit 31 restores the read information that has been read to the communication destination information (step S704).

Based on the restored communication destination information, the first terminal 3 communicates with the storage server 8, which is the communication destination indicated by the communication destination information, via the first network N according to the operation of the user (step S705).

When receiving communication from the first terminal 3, the input-output unit 81 of the storage server 8 reads the mail-related information stored in the storage unit 82 that is the communication destination for which the communication has been requested (step S706).

When the list of the mail-related information is stored together with the mail-related information at the storage destination for which the communication has been requested, the storage server 8 first outputs information related to the list of the mail-related information to the first terminal 3. The output unit 32 of the first terminal 3 outputs the list of the mail-related information based on the information related to the list of the mail-related information, and allows the user to select the mail-related information. The first terminal 3 requests the storage server 8 to communicate again, and reads the mail-related information stored in the storage unit 82 and selected by the user.

The output unit 32 of the first terminal 3 outputs information regarding communication with the communication destination indicated by the restored communication destination information, for example, an attached file that is the mail-related information stored in the storage server 8 (step S707).

By operating in this manner, the information conversion device 7 extracts the predetermined mail-related information from the received mail. Further, the information conversion device 7 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, in the fifth example embodiment of the present invention, the information conversion device 7 extracts the predetermined mail-related information from the received mail. Further, the information conversion device 7 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, the information conversion device 7 of the present example embodiment stores the mail-related information in the storage server 8, converts the communication destination information indicating the storage destination of the mail-related information into the read information, and adds the read information to the mail. Thus, the first terminal 3 can refer to the mail-related information without via the second terminal 4.

When an attached file that is the mail-related information has been extracted, the information conversion device 7 of the present example embodiment deletes the attached file from the original mail. Consequently, the second terminal 4 receives the mail not including the attached file from the mail server 2. Therefore, the second terminal 4 cannot refer to the attached file included in the original mail.

Thus, it is possible to reduce the risk of becoming a route of infection of a computer virus or information leakage due to infection of a virus by the second terminal 4 referring to the mail-related information.

Sixth Example Embodiment

Next, an information conversion system according to a sixth example embodiment of the present invention will be specifically described. The information conversion system of the present example embodiment authenticates the user when the first terminal 3 reads the mail-related information.

In the present example embodiment, the mail-related information is an attached file. The communication destination regarding the mail-related information is assumed as the storage destination of the attached file of the storage server 8.

Figure 13:
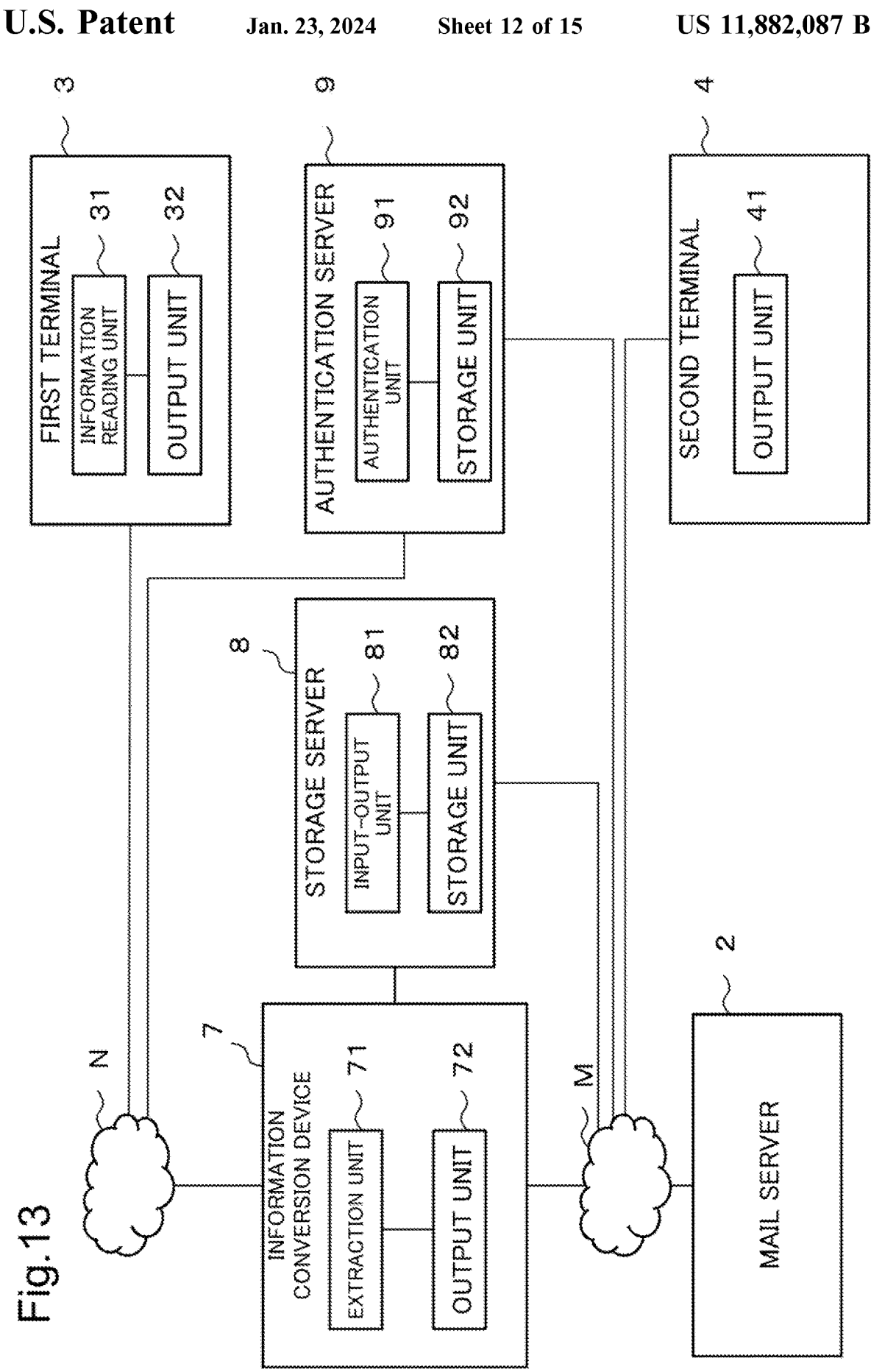
FIG. 13 is a diagram illustrating a configuration example of an information conversion system of a sixth example embodiment of the present invention.

FIG. 13 illustrates a configuration example of the information conversion system of the present example embodiment. The information conversion system of the present example embodiment includes a first network N, a second network M, an information conversion device 7, a mail server 2, a first terminal 3, a second terminal 4, a storage server 8, and an authentication server 9.

The storage server 8 and the authentication server 9 may be configured as the same device.

A plurality of first terminals 3 connected to the first network N may exist in the information conversion system. A plurality of second terminals 4 connected to the second network M may also exist in the information conversion system.

In the present example embodiment, the first network N is assumed as a network that cannot communicate with the second network M.

The second network M is assumed as a network that cannot communicate with the first network N.

The information conversion system of the present example embodiment is different from the information conversion system of the fifth example embodiment in that the information conversion system includes an authentication server 9. The other configurations are similar to those of the fifth example embodiment unless otherwise specified.

First, the storage server 8 will be described.

The input-output unit 81 of the storage server 8 performs reading of the mail-related information stored in the storage unit 82 on the first terminal 3 authenticated by the authentication server 9 based on the communication destination of the first terminal 3. The communication destination for which the first terminal 3 requests communication is the storage destination of the mail-related information.

The input-output unit 81 of the storage server 8 instructs the first terminal 3 that is not authenticated by the authentication server 9 to communicate with the authentication server 9.

Next, the authentication server 9 will be described.

When the first terminal 3 communicates with the storage server 8, the authentication server 9 determines whether to permit the first terminal to read the mail-related information of the storage server 8. The authentication server 9 includes an authentication unit 91 and a storage unit 92.

The authentication unit 91 authenticates the first terminal 3 that has communicated with the authentication server 9 based on the authentication information stored in the storage unit 92.

The authentication information is, for example, information used for authentication, such as a terminal unique identifier of the first terminal 3 or a password associated to the communication destination information indicating a storage destination.

The storage unit 92 stores the authentication information. The storage unit 92 may store the authentication information as an authentication list that is a list of the authentication information.

As an authentication method in the authentication server 9, for example, the following methods can be considered. The authentication method is not limited to the following methods.

(A) The authentication server 9 performs authentication based on a password generated for each mail and the communication destination information.

(B) The authentication server 9 performs authentication based on a password generated for each destination of the mail and the communication destination information.

(C) The authentication server 9 performs authentication based on a terminal unique identifier of the first terminal 3.

The authentication methods (A) to (C) will be specifically described below.

First, the authentication methods (A) and (B) will be described. Here, different portions in the authentication methods (A) and (B) will be first described, and then a common portion will be described.

First, a portion specific to the authentication method (A) will be described.

The extraction unit 71 of the information conversion device 7 generates a password for each mail with respect to the created communication destination information (communication destination information indicating the storage destination). Then, the extraction unit 71 outputs authentication information in which the communication destination information and the password are associated with each other to the authentication server 9. The authentication server 9 adds the authentication information output by the extraction unit 71 to the authentication list stored in the storage unit 92.

Instead of the information conversion device 7, the authentication unit 91 of the authentication server 9 may generate a password and associate the communication destination information with the password. In this case, the authentication unit 91 stores the authentication information in which the communication destination information and the password are associated with each other in the storage unit 92. Further, the authentication unit 91 outputs the authentication information to the extraction unit 71 of the information conversion device 7.

Next, a portion specific to the authentication method of (B) will be described.

In the authentication method (B), the authentication information includes communication destination information and a password generated for each piece of destination information. The storage unit 92 of the authentication server 9 stores the authentication list that is a list of the authentication information. Further, the storage unit 92 of the authentication server 9 stores the destination information and the password generated for each piece of the destination information.

The extraction unit 71 of the information conversion device 7 extracts the destination information that is information of a mail delivery destination from the received mail, and outputs the destination information and the communication destination information indicating the storage destination to the authentication server 9.

The authentication unit 91 of the authentication server 9 determines whether the destination information received from the extraction unit 71 is stored in the storage unit 92.

When the destination information received from the extraction unit 71 is stored in the storage unit 92, the authentication unit 91 of the authentication server 9 notifies the extraction unit 71 that a password is added to the destination information.

The authentication unit 91 of the authentication server 9 adds the authentication information in which the communication destination information and the password added to the destination information are associated with each other to the authentication list stored in the storage unit 92.

When the destination information received from the extraction unit 71 is not stored in the storage unit 92, the authentication unit 91 of the authentication server 9 requests the extraction unit 71 to generate a password. The extraction unit 71 generates a password, and outputs the communication destination information, the destination information, and the password to the authentication server 9 in association with one another. The authentication unit 91 of the authentication server 9 stores the destination information and the password generated for each piece of destination information in the storage unit 92 in association with each other. Further, the authentication unit 91 adds, to the authentication list, authentication information in which the communication destination information received from the extraction unit 71 and the password generated for each piece of destination information are associated with each other.

Instead of the information conversion device 7, the authentication unit 91 of the authentication server 9 may generate a password for each piece of the destination information. In this case, the authentication unit 91 adds, to the authentication list, the authentication information in which the communication destination information and the generated password are associated with each other. The authentication unit 91 outputs the authentication information (the communication destination information and the password generated for each piece of the destination information) to the extraction unit 71.

When the authentication method (B) is used, the password is determined for each destination. If the password is notified to the user who has received a mail every time the mail is received, the information conversion device 7 notifies the same password a plurality of times. Thus, the information conversion device 7 may notify the user of the password only when the password is generated, and may not notify the user of the password thereafter.

As a method for notifying the user of the password, the information conversion device 7 can use any method. For example, the extraction unit 71 of the information conversion device 7 may add a password to a mail including the mail-related information, or may create a mail for password notification.

The authentication server 9 may be configured as a web server, and may cause the user to determine or change a password associated to the destination information by a predetermined method.

Next, a portion common to the authentication methods (A) and (B) will be described.

The authentication unit 91 authenticates whether a set of communication destination information indicating a communication destination with which the first terminal 3 communicates and a password input according to the operation of the user is included in the authentication list stored in the storage unit 92.

Then, when the set of the communication destination information indicating the communication destination with which the first terminal 3 communicates and the password input according to the operation of the user is included in the authentication list stored in the storage unit 92, the authentication unit 91 permits the first terminal 3 to read the information of the storage server 8.

Finally, the authentication method (C) will be described.

The storage unit 92 of the authentication server 9 stores the authentication list in advance by a predetermined method. The authentication list is a list of identifiers (for example, MAC addresses) unique to terminals permitted to communicate with the storage server.

When the authentication method (C) is used, the authentication unit 91 authenticates whether the identifier of the first terminal 3 that has communicated with the storage server 8 that is the communication destination of the communication destination information is included in the authentication list stored in the storage unit 92 of the authentication server 9. Then, when the identifier of the first terminal 3 is included in the authentication list, the authentication unit 91 permits the first terminal 3 to read the information of the storage server 8.

Other than these methods, any method can be used as the authentication method.

In the present example embodiment, the authentication server 9 performs authentication by any of the authentication methods (A) to (C).

Next, the first terminal 3 will be described.

When a method using a password, such as the authentication method (A) or (B), is used for authentication, the first terminal 3 communicates with the storage server 8 that is the communication destination indicated by the communication destination information restored from the read information. The storage server 8 instructs the first terminal 3 that is not authenticated by the authentication server 9 to communicate with the authentication server 9. The authentication unit 91 of the authentication server 9 requests the first terminal 3 to input a password by a predetermined method. When the set of the communication destination information indicating the communication destination with which the first terminal 3 communicates and the password input according to the operation of the user is included in the authentication list stored in the storage unit 92, the authentication server 9 permits the first terminal 3 to read the information of the storage server 8. When reading is permitted, the first terminal 3 communicates with the storage server 8. The first terminal 3 reads the mail-related information from the storage server 8 and outputs the mail-related information.

When a method using a terminal unique identifier, such as the authentication method (C), is used for authentication, the first terminal 3 communicates with the storage server 8 that is the communication destination indicated by the communication destination information restored from the read information. The storage server 8 instructs the first terminal 3 that is not authenticated by the authentication server 9 to communicate with the authentication server 9. When the identifier of the first terminal 3 that has requested communication with the storage server 8 is included in the authentication list, the authentication unit 91 of the authentication server 9 permits the first terminal 3 to read the information of the storage server 8.

In the authentication method (C), unlike the authentication method (A) or (B), the authentication server 9 can authenticate the first terminal 3 without requiring the user to input a password.

Next, the information conversion device 7 of the present example embodiment will be described. The information conversion device 7 of the present example embodiment includes an extraction unit 71 and an output unit 72.

The extraction unit 71 extracts predetermined mail-related information from the received mail. The extraction unit 71 of the present example embodiment receives a mail addressed to a terminal connected to the second network M, and extracts the predetermined mail-related information from the received mail when mail-related information is included in the mail. In a case of the present example embodiment, since the mail-related information is an attached file, the extraction unit 71 extracts the attached file from the mail. The extraction unit 71 deletes the predetermined mail-related information from the original mail.

Further, the extraction unit 71 determines a storage destination of the mail-related information stored in the storage server 8. The extraction unit 71 outputs information of the storage destination of the mail-related information and the mail-related information to the storage server 8.

The extraction unit 71 creates the communication destination information indicating the storage destination of the mail-related information as a communication destination.

The output unit 72 converts the communication destination information of the communication destination related to the mail-related information into the read information readable by a method not via the second network M by the first terminal 3, which is not connected to the second network M to which the second terminal 4 that receives the mail is connected. In a case of the present example embodiment, the communication destination information of the communication destination regarding the mail-related information is the communication destination information indicating the storage destination of the mail-related information created by the extraction unit 71.

When a password is used for authentication, the output unit 72 may add the read information and the password to the mail and output the mail to the mail server 2, or may create a new mail for sending the password and output the mail to the mail server 2.

The output unit 72 adds the read information to the mail and outputs the read information to the mail server 2. The output unit 72 outputs, to the mail server 2, a mail to which the mail-related information is not attached when the extraction unit 71 receives the mail.

By configuring the information conversion device 7 in this manner, the information conversion device 7 extracts the predetermined mail-related information from the received mail. Further, the information conversion device 7 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, the information conversion system of the present example embodiment authenticates the first terminal 3 that requests reading of the storage server 8 that is the storage destination of the attached file. Thus, it is possible to prevent users other than the user of the second terminal 4 that is the destination of the mail from referring to the attached file, which is stored in the storage server 8 and is information held by the communication destination regarding the mail-related information.

Next, an operation example of the information conversion system of the present example embodiment will be described using FIG. 14.

Figure 14:
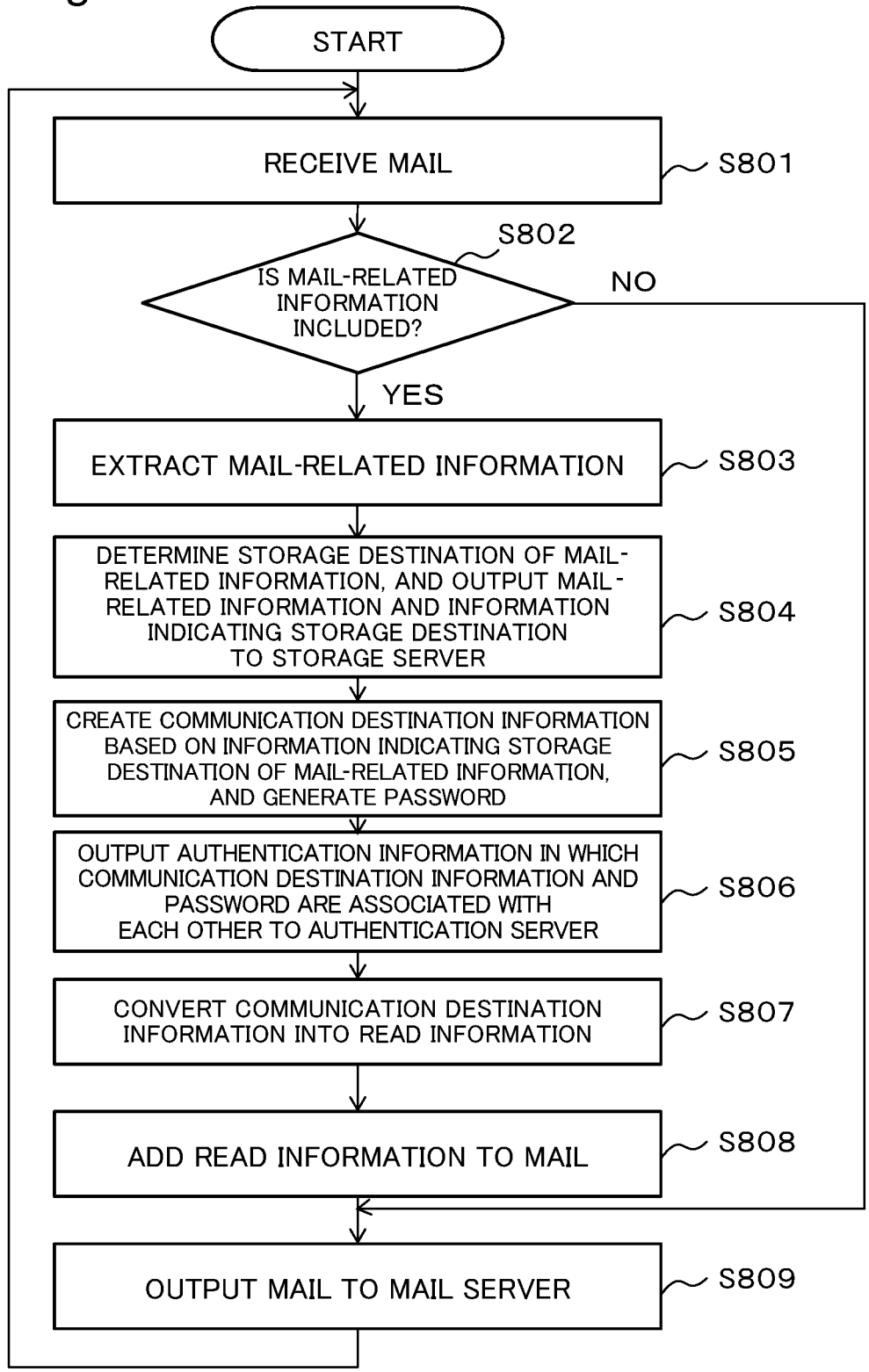
FIG. 14 is a flowchart illustrating an operation example of an information conversion device of the sixth example embodiment of the present invention.

The operation example of FIG. 14 is an operation example in a case where authentication of the first terminal 3 is performed by the authentication method (A).

The extraction unit 71 receives a mail addressed to a terminal connected to the second network M (step S801). In a case where the mail-related information is included in the mail (YES in step S802), the extraction unit 71 extracts the predetermined mail-related information from the received mail (step S803). When an attached file that is the predetermined mail-related information has been extracted, the extraction unit 71 deletes the attached file from the original mail.

In a case where the mail-related information is not included in the mail (step S802, NO), the extraction unit 71 does not perform the operations of steps S803 to S808.

Further, the extraction unit 71 determines a storage destination to store the mail-related information. The extraction unit 71 outputs the mail-related information and information indicating the storage destination of the mail-related information to the storage server 8 (step S804). The input-output unit 81 of the storage server 8 stores the mail-related information in the storage unit 82 based on the information indicating the storage destination.

Further, the extraction unit 71 creates the communication destination information indicating a storage destination of the mail-related information as a communication destination based on the information indicating the storage destination of the mail-related information, and generates a password for each mail with respect to the created communication destination information (communication destination information indicating the storage destination) (step S805).

The extraction unit 71 outputs authentication information in which the communication destination information and the password are associated with each other to the authentication server 9 (step S806). The authentication unit 91 of the authentication server 9 stores the authentication information in the storage unit 92.

When the authentication method (C) is used for authentication, the extraction unit 71 may not generate a password and output authentication information.

The output unit 72 converts the communication destination information created by the extraction unit 71 into the read information readable by the first terminal 3 by a method not via the second network M (step S807).

Further, the output unit 72 adds the read information to the mail (step S808), and outputs the mail to the mail server 2 (step S809). The output unit 72 also outputs, to the mail server 2, a mail that does not include the mail-related information at a time of reception by the extraction unit 71.

When the authentication server 9 performs authentication by a method using a password such as the authentication method (A) or (B), the output unit 72 may add the password to the mail together with the read information. Alternatively, the output unit 72 may create a new mail to send the password.

Figure 15:
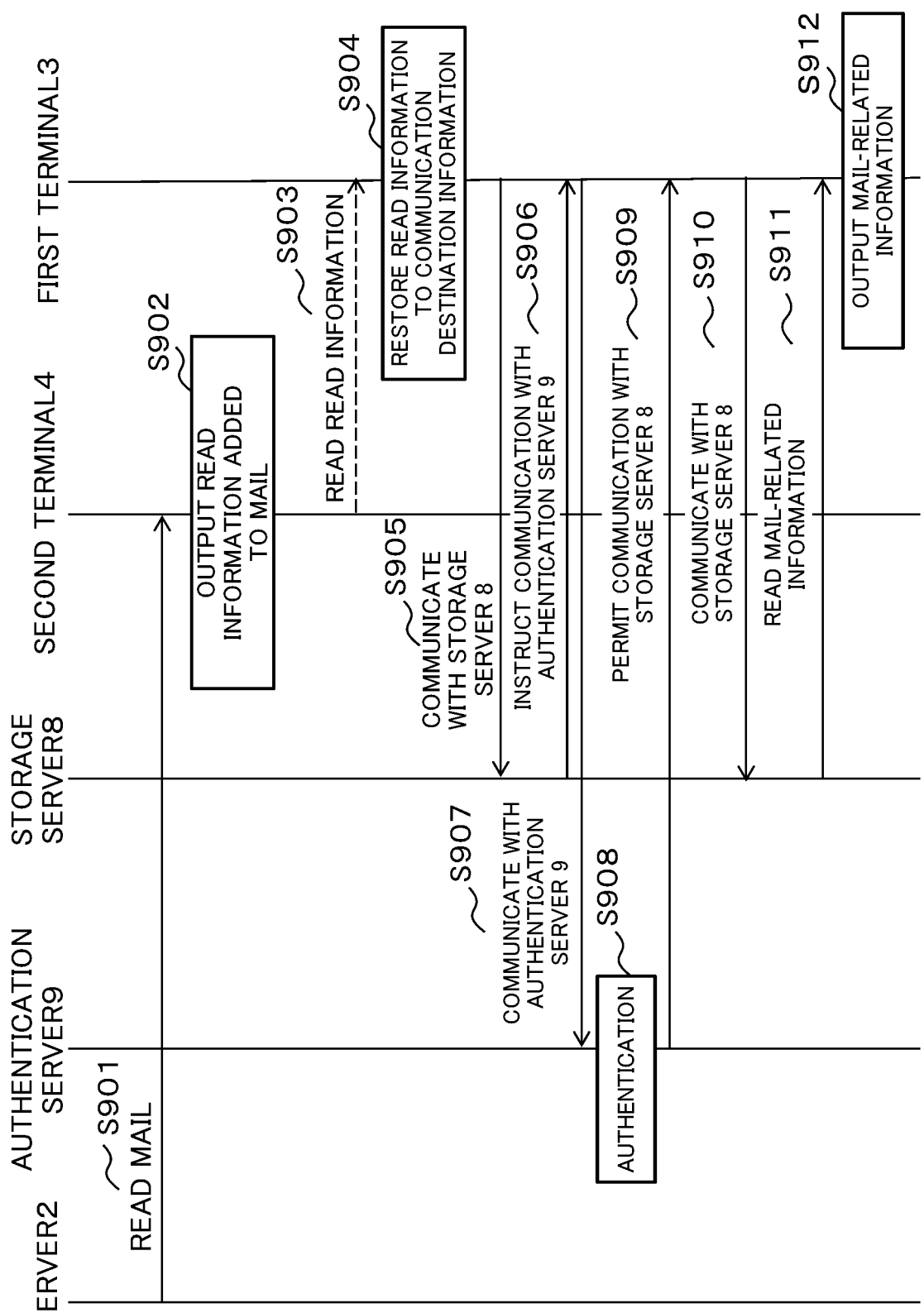
FIG. 15 is a diagram illustrating an operation example of the information conversion system of the sixth example embodiment of the present invention.

Next, an operation example in which the first terminal 3 of the present example embodiment refers to the mail-related information will be described using FIG. 15. A solid arrow illustrated in FIG. 15 indicates that the second terminal 4 reads a mail via the second network M, or transmission and reception of information via the first network N. A dotted line illustrated in FIG. 15 indicates that the first terminal 3 reads the read information by a method not via the second network M.

The second terminal 4 is connected to the second network M. According to an operation of the user, the second terminal 4 reads a mail stored in the mail server 2 (step S901).

The output unit 41 of the second terminal 4 outputs the read information added to the received mail according to the operation of the user (step S902).

The first terminal 3 is connected to the first network N.

The information reading unit 31 of the first terminal 3 reads the read information output to the second terminal 4 by a method not via the second network M according to the operation of the user (step S903).

Further, the information reading unit 31 restores the read information that has been read to the communication destination information (step S904).

Based on the restored communication destination information, the first terminal 3 communicates with the storage server 8 that is the communication destination indicated by the communication destination information via the first network N (step S905).

The storage server 8 instructs the first terminal 3 that is not authenticated by the authentication server 9 to communicate with the authentication server 9 (step S906).

The first terminal 3 communicates with the authentication server 9 (step S907).

The authentication unit 91 of the authentication server 9 authenticates the first terminal 3 by a predetermined method (step S908). When the first terminal 3 satisfies a predetermined condition, the authentication unit 91 permits the first terminal 3 to communicate with the storage server 8 (step S909).

The first terminal 3 communicates with the storage server 8 that is the communication destination indicated by the communication destination information (step S910), and reads the mail-related information associated to the communication destination information (step S911).

The output unit 32 of the first terminal 3 outputs information regarding communication with the communication destination indicated by the restored communication destination information, for example, an attached file that is the mail-related information stored in the storage server 8 (step S912).

By operating in this manner, the information conversion device 7 extracts the predetermined mail-related information from the received mail. Further, the information conversion device 7 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, in the sixth example embodiment of the present invention, the information conversion device 7 extracts the predetermined mail-related information from the received mail. Further, the information conversion device 7 converts the communication destination information of the communication destination related to the mail-related information into the read information, and outputs the mail to which the read information is added.

Thus, the first terminal 3 not connected to the second network M can read the read information included in the mail sent to the second terminal 4 connected to the second network M. Further, the first terminal 3 can communicate with the communication destination indicated by the communication destination information based on the read information.

Thus, the user can easily refer to information held by the communication destination regarding the mail-related information included in a mail sent to a terminal connected to a network in which communication with other networks is restricted.

As described above, when an attached file that is the mail-related information has been extracted, the information conversion device 7 of the present example embodiment deletes the attached file from the original mail. Consequently, the second terminal 4 receives the mail not including the attached file from the mail server 2. Therefore, the second terminal 4 cannot refer to the attached file included in the original mail.

Thus, it is possible to reduce the risk of becoming a route of infection of a computer virus or information leakage due to infection of a virus by the second terminal 4 referring to the mail-related information.

The information conversion system of the present example embodiment authenticates the first terminal 3 that requests reading of the storage server 8 that is the storage destination of the attached file. Thus, it is possible to prevent users other than the mail transmission destination from referring to the attached file that is stored in the storage server 8 and is information held by the communication destination regarding the mail-related information.

When the authentication server 9 has a function capable of changing a password stored in the authentication list according to the operation of the user, the user can manage the password when authenticating the first terminal 3 that reads the mail-related information stored in the storage server 8.

[Hardware Configuration Example]

A configuration example of hardware resources for achieving the information conversion device (1, 5, 7) according to each of the example embodiments of the present invention described above by using one information processing device (computer) will be described. The information conversion device may be achieved by using at least two information processing devices physically or functionally. The information conversion device may be achieved as a dedicated device. Only a part of the functions of the information conversion device may be achieved by using the information processing device.

Figure 16:
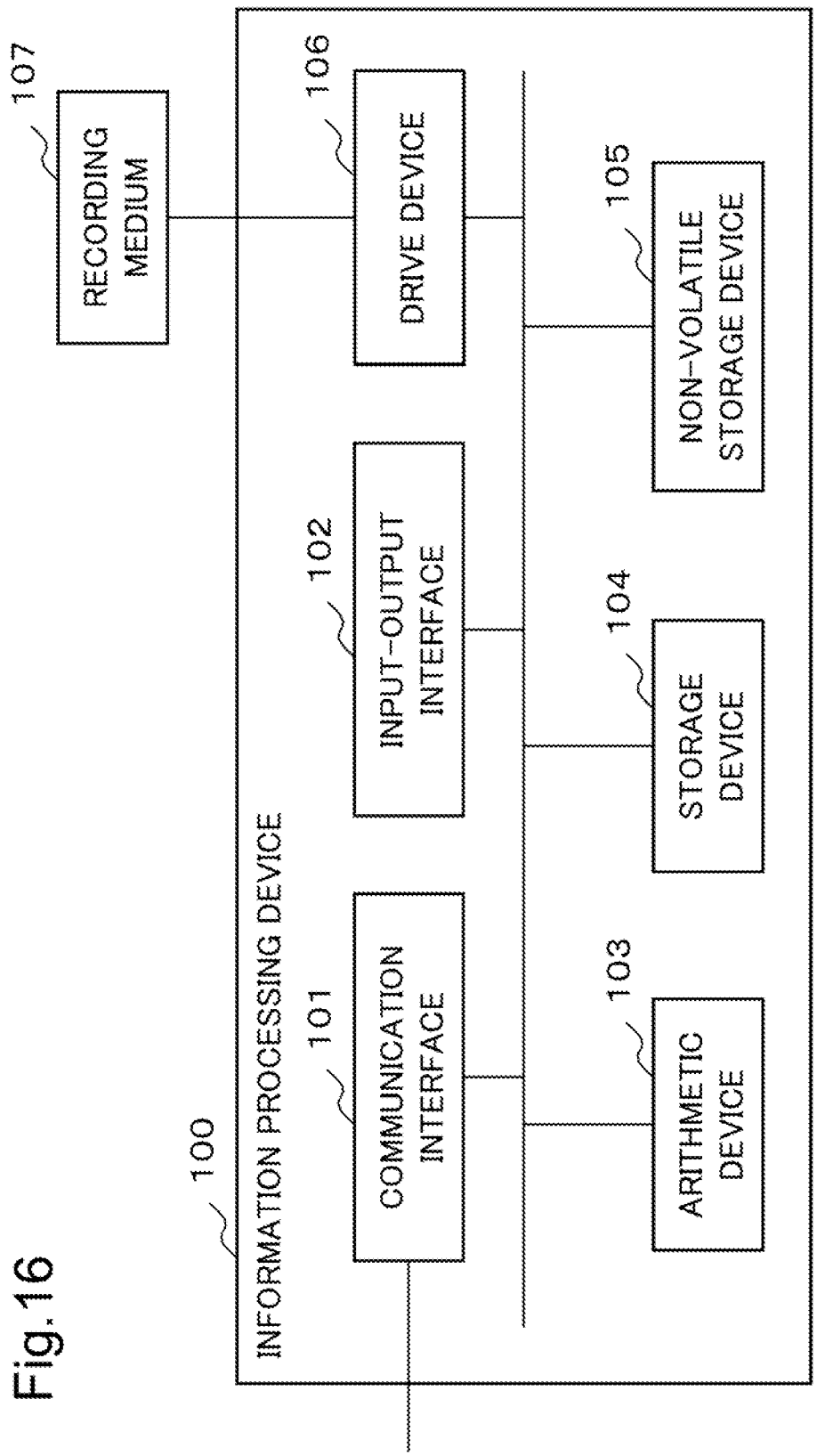
FIG. 16 is a diagram illustrating a hardware configuration example of each example embodiment of the present invention.

FIG. 16 is a diagram schematically illustrating a hardware configuration example of the information processing device capable of achieving the information conversion device of each of the example embodiments of the present invention. The information processing device 100 includes a communication interface 101, an input-output interface 102, an arithmetic device 103, a storage device 104, a non-volatile storage device 105, and a drive device 106.

For example, the extraction unit 11 in FIG. 1 can be achieved by the arithmetic device 103. The output unit 12 can be achieved by the arithmetic device 103 and the input-output interface 102.

The communication interface 101 is a communication means configured for the information conversion device of each of the example embodiments to communicate with an external device by wire or/and wireless. In a case where the information conversion device is achieved by using at least two information processing devices, the devices may be connected so as to be able to communicate with each other via the communication interface 101.

The input-output interface 102 is a man-machine interface such as a keyboard as an example of an input device and a display as an output device.

The arithmetic device 103 is achieved by an arithmetic processing device such as a general-purpose central processing unit (CPU) or a microprocessor, or a plurality of electric circuits. For example, the arithmetic device 103 can read various programs stored in the non-volatile storage device 105 into the storage device 104 and execute processing according to the read programs.

The storage device 104 is a memory device such as a random access memory (RAM), which can be referred to from the arithmetic device 103, and stores programs, various data, and the like. The storage device 104 may be a volatile memory device.

The non-volatile storage device 105 is, for example, a non-volatile storage device such as a read only memory (ROM), a flash memory, or the like, and can store various programs, data, and the like.

The drive device 106 is, for example, a device that reads or writes data to a recording medium 107, which will be described later.

The recording medium 107 is, for example, any recording medium capable of recording data, such as an optical disk, a magneto-optical disk, a semiconductor flash memory, or the like.

Each of the example embodiments of the present invention may be achieved, for example, by configuring an information conversion device with the information processing device 100 illustrated in FIG. 16, and supplying to the information conversion device a program capable of achieving the functions described in each of the example embodiments described above.

In this case, the example embodiment can be achieved by executing a program supplied to the information conversion device by the arithmetic device 103. It is also possible to configure not all but a part of the functions of the information conversion device by the information processing device 100.

The program may be recorded on the recording medium 107, and the program may be appropriately stored in the non-volatile storage device 105 in a shipping stage, an operating stage, or the like of the information conversion device. In this case, as a method of supplying the program, a method of installing the program in the information conversion device using an appropriate jig may be employed in a manufacturing stage before shipment, an operating stage, or the like. As a method of supplying the program, a general procedure such as downloading from the outside through a communication line such as the first network may be employed.

The whole or part of the example embodiments disclosed above can be described as, but not limited to, the following supplementary notes.

(Supplementary Note 1)

An information conversion device comprising:
an extraction means configured to extract predetermined mail-related information from a received mail; and
an output means configured to perform conversion of communication destination information of a communication destination related to the mail-related information into read information that allows the communication destination information to be read by a first terminal, which is not connected to a network to which a second terminal that receives the mail is connected, by a method not via the network, and output the mail to which the read information is added to the second terminal.

(Supplementary Note 2)

The information conversion device according to supplementary note 1, in which
the extraction means
extracts the mail-related information when the mail-related information is included in the mail, and
does not extract the mail-related information when the mail-related information is not included in the mail.

(Supplementary Note 3)

The information conversion device according to supplementary note 1 or 2, in which
the extraction means deletes the mail-related information from the mail.

(Supplementary Note 4)

The information conversion device according to any one of supplementary notes 1 to 3, in which
the mail-related information is the communication destination information.

(Supplementary Note 5)

The information conversion device according to supplementary note 4, further comprising
a verification means configured to perform verification of safety of communication with the communication destination indicated by the communication destination information.

(Supplementary Note 6)

The information conversion device according to supplementary note 5, in which
the output means performs the conversion from the communication destination information into the read information when the verification is made that the communication with the communication destination indicated by the communication destination information is not safe, and does not perform the conversion from the communication destination information into the read information when the verification is made that the communication with the communication destination indicated by the communication destination information is safe.

(Supplementary Note 7)

The information conversion device according to supplementary note 5 or 6, in which
the verification means performs the verification of the safety of the communication with the communication destination indicated by the communication destination information by communicating with the communication destination indicated by the communication destination information.

(Supplementary Note 8)

The information conversion device according to any one of supplementary notes 5 to 7, in which
the verification means performs the verification based on a collation list that is a list of the communication destination information indicating the communication destination with which communication is permitted or prohibited.

(Supplementary Note 9)

The information conversion device according to supplementary note 8, in which
the verification means rewrites the collation list based on a result of the verification.

(Supplementary Note 10)

The information conversion device according to supplementary note 1, in which
the mail-related information is a file attached to the mail,
the extraction means determines a storage destination of the file and stores the file in the storage destination, and
the communication destination information includes information indicating the storage destination of the file as information indicating the communication destination.

(Supplementary Note 11)

The information conversion device according to supplementary note 10, in which
the extraction means generates a password associated to the communication destination information, and
the output means outputs the mail to which the password is added.

(Supplementary Note 12)

An information conversion system comprising:
the information conversion device according to any one of supplementary notes 1 to 8;
a mail server that receives the mail to which the read information is added from the information conversion device;
the second terminal that receives the mail to which the read information is added from the mail server and outputs the read information; and
the first terminal.

(Supplementary Note 13)

An information conversion system comprising:
the information conversion device according to supplementary note 8 or 9;
a mail server that receives the mail to which the read information is added from the information conversion device;
the second terminal that receives the mail to which the read information is added from the mail server and outputs the read information;
the first terminal; and
a collation server that permits or prohibits the communication of the second terminal based on the collation list.

(Supplementary Note 14)

An information conversion system comprising:
the information conversion device according to supplementary note 10;
a mail server that receives the mail to which the read information is added from the information conversion device;
the second terminal that receives the mail to which the read information is added from the mail server and outputs the read information;
the first terminal; and
a storage server that stores the extracted file based on the communication destination information.

(Supplementary Note 15)

An information conversion system comprising:
the information conversion device according to supplementary note 10 or 11;
a mail server that receives the mail to which the read information is added from the information conversion device;
the second terminal that receives the mail to which the read information is added from the mail server and outputs the read information;
the first terminal; and
an authentication server that authenticates the first terminal that reads the file stored in the storage destination.

(Supplementary Note 16)

An information conversion method comprising:
extracting predetermined mail-related information from a received mail; and
performing conversion of communication destination information of a communication destination related to the mail-related information into read information that allows the communication destination information to be read by a first terminal, which is not connected to a network to which a second terminal that receives the mail is connected, by a method not via the network, and outputting the mail to which the read information is added to the second terminal.

(Supplementary Note 17)

The information conversion method according to supplementary note 16, in which
the mail-related information is extracted when the mail-related information is included in the mail, and
the mail-related information is not extracted when the mail-related information is not included in the mail.

(Supplementary Note 18)

The information conversion method according to supplementary note 16 or 17, in which
the mail-related information is deleted from the mail.

(Supplementary Note 19)

The information conversion method according to any one of supplementary notes 16 to 18, in which
the mail-related information is the communication destination information.

(Supplementary Note 20)

The information conversion method according to supplementary note 19, further comprising
performing verification of safety of communication with the communication destination indicated by the communication destination information.

(Supplementary Note 21)

The information conversion method according to supplementary note 20, in which
the conversion from the communication destination information into the read information is performed when the verification is made that the communication with the communication destination indicated by the communication destination information is not safe, and
the conversion from the communication destination information into the read information is not performed when the verification is made that the communication with the communication destination indicated by the communication destination information is safe.

(Supplementary Note 22)

The information conversion method according to supplementary note 20 or 21, in which
the verification of the safety of the communication with the communication destination indicated by the communication destination information is performed by communicating with the communication destination indicated by the communication destination information.

(Supplementary Note 23)

The information conversion method according to any one of supplementary notes 20 to 22, in which the verification is performed based on a collation list that is a list of the communication destination information indicating the communication destination with which communication is permitted or prohibited.

(Supplementary Note 24)

The information conversion method according to supplementary note 23, in which the collation list is rewritten based on a result of the verification.

(Supplementary Note 25)

The information conversion method according to supplementary note 16, in which the mail-related information is a file attached to the mail, the information conversion method includes determining a storage destination of the file and storing the file in the storage destination, and the communication destination information includes information indicating the storage destination of the file as information indicating the communication destination.

(Supplementary Note 26)

The information conversion method according to supplementary note 25, further comprising:

generating a password used for authentication; and outputting the mail to which the password is added.

(Supplementary Note 27)

A computer-readable recording medium recording an information conversion program for causing a computer to achieve:

an extraction function that extracts predetermined mail-related information from a received mail; and an output function that performs conversion of communication destination information of a communication destination related to the mail-related information into read information that allows the communication destination information to be read by a first terminal, which is not connected to a network to which a second terminal that receives the mail is connected, by a method not via the network, and outputs the mail to which the read information is added to the second terminal.

(Supplementary Note 28)

The computer-readable recording medium recording the information conversion program according to supplementary note 27, in which the extraction function extracts the mail-related information when the mail-related information is included in the mail, and does not extract the mail-related information when the mail-related information is not included in the mail.

(Supplementary Note 29)

The computer-readable recording medium recording the information conversion program according to supplementary note 27 or 28, in which the extraction function deletes the mail-related information from the mail.

(Supplementary Note 30)

The computer-readable recording medium recording the information conversion program according to any one of supplementary notes 27 to 29, in which the mail-related information is the communication destination information.

(Supplementary Note 31)

The computer-readable recording medium recording the information conversion program according to supplementary note 30, further causing the computer to achieve:

a verification function that verifies safety of communication with the communication destination indicated by the communication destination information.

(Supplementary Note 32)

The computer-readable recording medium recording the information conversion program according to supplementary note 31, in which the output function performs the conversion from the communication destination information into the read information when the verification is made that the communication with the communication destination indicated by the communication destination information is not safe, and does not perform the conversion from the communication destination information into the read information when the verification is made that the communication with the communication destination indicated by the communication destination information is safe.

(Supplementary Note 33)

The computer-readable recording medium recording the information conversion program according to supplementary note 31 or 32, in which the verification function performs the verification of the safety of the communication destination indicated by the communication destination information by communicating with the communication destination indicated by the communication destination information.

(Supplementary Note 34)

The computer-readable recording medium recording the information conversion program according to any one of supplementary notes 31 to 33, in which the verification function performs the verification based on a collation list that is a list of the communication destination information indicating the communication destination with which communication is permitted or prohibited.

(Supplementary Note 35)

The computer-readable recording medium recording the information conversion program according to supplementary note 34, in which the verification function rewrites the collation list based on a result of the verification.

(Supplementary Note 36)

The computer-readable recording medium recording the information conversion program according to supplementary note 27, in which the mail-related information is a file attached to the mail, the extraction function determines a storage destination of the file and stores the file in the storage destination, and the communication destination information includes information indicating the storage destination of the file as information indicating the communication destination.

(Supplementary Note 37)

The computer-readable recording medium recording the information conversion program according to supplementary note 36, in which the extraction function generates a password associated to the communication destination information, and the output function outputs the mail to which the password is added.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-172806, filed on Sep. 24, 2019, the disclosure of which is incorporated herein in its entirety by reference.

REFERENCE SIGNS LIST 1, 5, 7 information conversion device
11, 51, 71 extraction unit
12, 53, 72 output unit
2 mail server
3 first terminal
31 information reading unit
32 output unit
4 second terminal
41 output unit
52 verification unit
6 collation server
61 collation unit
62 storage unit
8 storage server
81 input-output unit
82 storage unit
9 authentication server
91 authentication unit
92 storage unit
100 information processing device
101 communication interface
102 input-output interface
103 arithmetic device
104 storage device
105 non-volatile storage device
106 drive device
107 recording medium
N first network
M second network

What is claimed is:

1. A mail-related information conversion device comprising:
one or more memories storing instructions; and
one or more processors configured to execute the instructions to:
extract predetermined mail-related information from mail that has been received,
convert communication destination information regarding the mail-related information into read information in an output format that a first terminal is able to read without having to communicate through a first network to which the first terminal is connected and through a second network to which a second terminal is connected, the first terminal not connected to the second network to which the second terminal that receives the mail is connected,
add the read information to the mail, and
output, to the second terminal, the mail to which the read information has been added, wherein
the second terminal presents the read information to the first terminal without communication through the second network.

2. The mail-related information conversion device according to claim 1,
wherein the one or more processors are configured to execute the instructions to extract the mail-related information when the mail-related information is included in the mail, and
not extract the mail-related information when the mail related mail-related information is not included in the mail.

3. The mail-related information conversion device according to claim 1,
wherein the one or more processors are configured to execute the instructions to delete the mail-related information from the mail.

4. The mail-related information conversion device according to claim 1, wherein
the mail-related information is the communication destination information.

5. The mail-related information conversion device according to claim 4,
wherein the one or more processors are configured to execute the instructions to perform verification of safety of communication with the communication destination indicated by the communication destination information.

6. The mail-related information conversion device according to claim 5,
wherein the one or more processors are configured to execute the instructions to convert the communication destination information into the read information when the verification indicates that the communication with the communication destination indicated by the communication destination information is not safe, and not convert the communication destination information into the read information when the verification indicates that the communication with the communication destination indicated by the communication destination information is safe.

7. The mail-related information conversion device according to claim 5,
wherein the one or more processors are configured to execute the instructions to perform the verification of the safety of the communication with the communication destination indicated by the communication destination information by communicating with the communication destination indicated by the communication destination information.

8. The mail-related information conversion device according to claim 5,
wherein the one or more processors are configured to execute the instructions to perform the verification based on a collation list of the communication destination information indicating the communication destination with which communication is permitted or prohibited.

9. The mail-related information conversion device according to claim 8,
wherein the one or more processors are configured to execute the instructions to rewrite the collation list based on a result of the verification.

10. A mail-related information conversion system comprising:
the information conversion device according to claim 8;
a mail server that receives, from the information conversion device, the mail to which the read information has been added, and that outputs the mail to the second terminal;

the second terminal that receives, from the mail server, the mail to which the read information is added and that outputs the read information;

the first terminal; and a collation server that permits or prohibits communication with the second terminal based on the collation list.

11. The mail-related information conversion device according to claim 1, wherein the mail-related information is a file attached to the mail, wherein the one or more processors are configured to execute the instructions to determine a storage destination of the file and store the file in the storage destination, and wherein the communication destination information includes information indicating the storage destination of the file as information indicating the communication destination.

12. The mail-related information conversion device according to claim 11, wherein the one or more processors are configured to execute the instructions to:

generate a password associated with the communication destination information, add the password to the mail, and output the mail to which the password has been added.

13. A mail-related information conversion system comprising:

the information conversion device according to claim 11;

a mail server that receives, from the information conversion device, the mail to which the read information has been added, and that outputs the mail to the second terminal;

the second terminal that receives, from the mail server, the mail to which the read information is added and that outputs the read information;

the first terminal; and a storage server that stores the extracted file based on the communication destination information.

14. A mail-related information conversion system comprising:

the information conversion device according to claim 11;

a mail server that receives, from the information conversion device, the mail to which the read information has been added, and that outputs the mail to the second terminal;

the second terminal that receives, from the mail server, the mail to which the read information is added and that outputs the read information;

the first terminal; and an authentication server that authenticates the first terminal that reads the file stored in the storage destination.

15. A mail-related information conversion system comprising:

the information conversion device according to claim 1;

a mail server that receives, from the information conversion device, the mail to which the read information has been added, and that outputs the mail to the second terminal;

the second terminal that receives, from the mail server, the mail to which the read information is added and that outputs the read information; and the first terminal.

16. A mail-related information conversion method comprising:

extracting, by a processor, predetermined mail-related information from mail that has been received, converting, by the processor, communication destination information regarding the mail-related information into read information in an output format that a first terminal is able to read without having to communicate through a first network to which the first terminal is connected and through a second network to which a second terminal is connected, the first terminal not connected to the second network to which the second terminal that receives the mail is connected, adding, by the processor, the read information to the mail, and outputting, by the processor and to the second terminal, the mail to which the read information has been added, wherein the second terminal presents the read information to the first terminal without communication through the second network.

17. The mail-related information conversion method according to claim 16, wherein the mail-related information is extracted when the mail-related information is included in the mail, and the mail-related information is not extracted when the mail-related information is not included in the mail.

18. The mail-related information conversion method according to claim 16, wherein the mail-related information is deleted from the mail.

19. The mail-related information conversion method according to claim 16, wherein the mail-related information is the communication destination information.

20. A non-transitory computer-readable recording medium storing a mail-related information conversion program executable by a computer to perform:

extracting predetermined mail-related information from mail that has been received, converting communication destination information regarding the mail-related information into read information in an output format that a first terminal is able to read without having to communicate through a first network to which the first terminal is connected and through a second network to which a second terminal is connected, the first terminal not connected to the second network to which the second terminal that receives the mail is connected, adding the reading information to the mail, and outputting, to the second terminal, the mail to which the read information has been added, wherein the second terminal presents the read information to the first terminal without communication through the second network.

* * * * *